US011290332B2

(12) United States Patent
Mutnuru et al.

(10) Patent No.: US 11,290,332 B2
(45) Date of Patent: Mar. 29, 2022

(54) SYSTEM AND METHOD FOR MODELLING CLOUD NETWORKS FOR AUTOMATION

(71) Applicant: Oracle International Corporation, Redwood Shores, CA (US)

(72) Inventors: Rishi Kaundinya Mutnuru, San Jose, CA (US); Iain Roger Cadd, Dalkeith (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/932,593

(22) Filed: Jul. 17, 2020

(65) Prior Publication Data

US 2021/0184936 A1 Jun. 17, 2021

Related U.S. Application Data

(60) Provisional application No. 62/946,808, filed on Dec. 11, 2019.

(51) Int. Cl.
*H04L 12/24* (2006.01)
*H04L 12/751* (2013.01)
(Continued)

(52) U.S. Cl.
CPC ...... *H04L 41/0886* (2013.01); *H04L 41/0813* (2013.01); *H04L 41/0893* (2013.01);
(Continued)

(58) Field of Classification Search
CPC ............. H04L 41/0886; H04L 41/0813; H04L 41/0893; H04L 41/12; H04L 45/02;
(Continued)

(56) References Cited

U.S. PATENT DOCUMENTS 10,374,872 B2 8/2019 Ratkovic et al.
10,523,504 B1 12/2019 Jain et al.
(Continued)

OTHER PUBLICATIONS

"Ansible for Network Automation", Available Online at: https://docs.ansible.com/ansible/latest/network/, Copyright 2019, Red Hat, Inc, last updated Jul. 21, 2020, 5 pages.
(Continued)

*Primary Examiner* — Charles C Jiang
*Assistant Examiner* — Shawn D Miller
(74) *Attorney, Agent, or Firm* — Kilpatrick Townsend & Stockton LLP

(57) ABSTRACT

The present is directed to systems, methods, and devices for modelling cloud networks for automation, The system can include a computing network including at least one transit router and a plurality of switches. The system can include at least one server that can access model information for the computing network, and set up the computing network based upon the model information. Setting up the computing network can include creating a topology database, and building the computing network based on the topology database. The topolopgy data can be created by creating switches at each layer in the computing network, mapping links connecting the switches, each link connecting a pair of switches, creating Border Gateway Protocol ("BGP") routing for both an underlay network and an overlay network, creating a topology graph of the computing network, and generating Zero Touch Provisioning ("ZTP") links.

20 Claims, 18 Drawing Sheets

(51) Int. Cl.

| | |
|---|---|
| ***H04L 12/715*** | (2013.01) |
| ***H04L 12/723*** | (2013.01) |
| ***H04L 41/08*** | (2022.01) |
| ***H04L 41/12*** | (2022.01) |
| ***H04L 41/0813*** | (2022.01) |
| ***H04L 41/0893*** | (2022.01) |
| ***H04L 45/02*** | (2022.01) |
| ***H04L 45/00*** | (2022.01) |
| ***H04L 45/50*** | (2022.01) |
| ***H04L 45/64*** | (2022.01) |

(52) U.S. Cl.
CPC .............. *H04L 41/12* (2013.01); *H04L 45/02* (2013.01); *H04L 45/04* (2013.01); *H04L 45/50* (2013.01); *H04L 45/64* (2013.01)

(58) Field of Classification Search
CPC ......... H04L 45/04; H04L 45/50; H04L 45/64; H04L 41/0806; H04L 41/0846
See application file for complete search history.

(56) References Cited

U.S. PATENT DOCUMENTS

2015/0341220 A1 11/2015 Sikand et al.
2018/0034698 A1* 2/2018 Perez .................. H04L 41/0886
2019/0116116 A1* 4/2019 Przygienda ............. H04L 45/48
2019/0319830 A1 10/2019 Karam et al.

OTHER PUBLICATIONS

"Extreme IP Fabrics Deliver Automated Cloud Data Center Scale and Agility", Extreme, Available Online at: https://cloud.kapostcontent.net/pub/5b7570a4-969a-436b-b37a-cc43cae8b217/ip-fabrics-deliver-automated-cloud-data-center-scale-and-agility-solution-brief.pdf?kui=KKN3E36d4YzK3B2KcYTKag, Accessed from Internet on Jul. 27, 2020, 7 pages.
"Terraform", HashiCorp, Available Online at: https://www.terraform.io/intro/index.html, Accessed from Internet on Jul. 27, 2020, 3 pages.
Brikman; Yevgeniy, "Why We Use Terraform and Not Chef, Puppet, Ansible, Saltstack, or CloudFormation", Gruntwork, Available Online at: https://blog.gruntwork.io/why-we-use-terraform-and-not-chef-puppet-ansible-saltstack-or-cloudformation-7989dad2865c, Sep. 26, 2016, 16 pages.
Dolstra et al., "Charon: Declarative Provisioning and Deployment", 1st International Workshop on Release Engineering, Available Online at: https://edolstra.github.io/pubs/charon-releng2013-final.pdf, May 20, 2013, 4 pages.
El Maghraoui et al., "Model Driven Provisioning: Bridging the Gap Between Declarative Object Models and Procedural Provisioning Tools", Middleware, Conference Paper, Nov. 2006, 21 pages.

* cited by examiner

SYSTEM AND METHOD FOR MODELLING CLOUD NETWORKS FOR AUTOMATION

CROSS-REFERENCES TO RELATED APPLICATIONS

This application claims the benefit of U.S. Provisional Application No. 62/946,808, filed on Dec. 11, 2019, and entitled "Modelling Cloud Networks for Automation," the entirety of which is hereby incorporated by reference herein.

TECHNICAL FIELD

The present disclosure relates generally to networking, and more particularly to techniques for setting up and managing networks, such as CLOS networks, for a cloud services provider.

BACKGROUND

Data centers play an important role in modern software technology. Data centers frequently employ multiple servers connected interconnected via a switch architecture. Via this switch architecture, the servers are able to communicate with each other, as well as communicate with devices outside of the data center.

Such switch architectures have evolved and improved over time. Some of these improvements have included a change in architecture from tree architectures to more modern, spine-and-leaf architectures. These modern architectures provide significant benefits, including decreased and consistent latency.

These improvements in data center architecture have been driven, in part, by ever increasing needs for processing capability and increased processing speeds. Increasing processing demands have resulted in the growth of data centers, and specifically in the growth in the number of servers a switches forming the data center. Due to this growth, further improvements to the creation, control, and operation of data centers are desired.

BRIEF SUMMARY

The present disclosure relates generally to networking, and more particularly to techniques for setting up and managing networks, such as CLOS networks, for a cloud services provider.

Techniques are described for automating the network configuration and management of a cloud network through a centralized location. The techniques include enabling the network to be defined using a network model. The model encapsulates information related to the network, such as the network topology (e.g., whether the network is a 2-tier, 3-tier, or n-tier network), network hierarchy, identification of components (e.g., various devices) of the network, characteristics/features and configurations for components of the network, and the like. A system (referred to as the Network Deployment System (NDS) or Network Management System (NMS)) is provided that can consume the model information and automate the set-up and management of the network. Based upon the model information, the NDS automates the performance of tasks for setting up and managing the network. In certain embodiments, the model information is vendor-agnostic, i.e., does not depend upon a vendor providing a particular network component. The NDS acts as the single administrative system for setting up and managing the network using the model information. In certain embodiments, one NDS is provided for each CLOS network.

One aspect of the present application relates to a method for modelling cloud networks for automation. The method includes accessing by a network deployment system model information for a computing network including a plurality of layers of linked devices. In some embodiments, the model information specifies a network topology for the computing network, a plurality of components of the computing network, and information identifying hierarchical relationships between one or more components from the plurality of components. The method includes setting up the computing network by the network deployment system based upon the model information. In some embodiments, setting up the computing network includes creating a topology database. Creating the topology database includes creating switches at each layer in the computing network, mapping links connecting the switches, each link connecting a pair of switches, creating Border Gateway Protocol ("BGP") routing for both an underlay network and an overlay network, creating a topology graph of the computing network, and generating Zero Touch Provisioning ("ZTP") links. The method includes building the computing network based on the topology database.

In some embodiments, the topology graph includes a plurality of nodes, each of the plurality of nodes representing one of the devices in the computing network. In some embodiments, the nodes are connected by edges, each of the edges representing one link. In some embodiments, creating switches at each layer in the computing network includes determining a hierarchy of devices in the computing network, the hierarchy defining a plurality of tiers of the computing network and identifying devices within each tier of the computing network, computing a number of switches in each tier of the computing network, and adding a representation of each of at least some of the identified devices to a device database. In some embodiments, adding a representation of each of the at least some of the identified devices to the device database includes: adding switch attributes, and adding a physical interface list. In some embodiments, the representation of each of at least some of the identified devices includes a Domain Name Server ("DNS") name.

In some embodiments, mapping links connecting the switches includes identifying links from each of the tiers in the computing network, assigning a link identifier to each of the identified links, and storing the link identifiers in a link table. In some embodiments, identifying links from each of the tiers in the computing network includes identifying peer links between leaf devices. In some embodiments, creating the topology database further includes allocating an internet protocol ("IP") address for each device in the computing network. In some embodiments, creating the topology graph includes: placing nodes associated with transit routers at a top of the topology graph, and organizing the nodes according to hierarchy and links. In some embodiments, creating the topology graph comprises ingesting the nodes and edges into a visualization tool, and storing an output of the visualization tool as the topology graph in the topology database.

In some embodiments, creating the topology database further includes processing any virtual chassis configuration associated with devices in the computing network. In some embodiments, creating the topology database further includes creating a cable map and a DNS map. In some embodiments, creating the topology database further includes associating communications features with leaf devices in the computing network. In some embodiments, the communications features comprise at least one of a virtual local area network ("VLAN"), virtual routing and forwarding ("VRF"), a VLAN interface, and a VLAN port.

In some embodiments, generating ZTP links includes, for each device in the computing network, receiving a configuration file corresponding to a unique name for the device. In some embodiments, the unique name is generated at least in part based on directly linked devices. In some embodiments, directly linked devices are identified according to communications exchanged via Link Layer Discovery Protocol ("LLDP").

One aspect of the present disclosure relates to a non-transitory computer-readable storage medium storing a plurality of instructions executable by one or more processors. The plurality of instructions when executed by the one or more processors cause the one or more processors to: access model information for a computing network including a plurality of layers of linked devices, and set up the computing network based upon the model information. Setting up the computing network can include creating a topology database and building the computing network based on the topology database. In some embodiments, creating the topology database includes: creating switches at each layer in the computing network, mapping links connecting the switches, each of which links connects a pair of switches, creating Border Gateway Protocol ("BGP") routing for both an underlay network and an overlay network, creating a topology graph of the computing network, and generating Zero Touch Provisioning ("ZTP") links.

In some embodiments, the model information specifies a network topology for the computing network, a plurality of components of the computing network, and information identifying hierarchical relationships between one or more components from the plurality of components. In some embodiments, the topology graph includes a plurality of nodes, each of the plurality of nodes representing one of the devices in the computing network. In some embodiments, the nodes are connected by edges, each of the edges representing one link. In some embodiments, creating the topology graph includes: placing nodes associated with transit routers at a top of the topology graph, and organizing the nodes according to hierarchy and links. In some embodiments, creating the topology graph includes ingesting the nodes and edges into a visualization tool, and storing an output of the visualization tool as the topology graph in the topology database.

One aspect of the present disclosure relates to a system including a computing networking including at least one transit router and a plurality of switches, and at least one server communicatingly coupled with the computing network. The at least one server is configured to: access model information for a computing network including a plurality of layers of linked devices, the model information specifying a network topology for the computing network, a plurality of components of the computing network, and information identifying hierarchical relationships between one or more components from the plurality of components, and set up the computing network based upon the model information. Setting up the computing network includes creating a topology database and building the computing network based on the topology database. Creating the topology database includes: creating switches at each layer in the computing network, mapping links connecting the switches, each of which links connects a pair of switches, creating Border Gateway Protocol ("BGP") routing for both an underlay network and an overlay network, creating a topology graph of the computing network, and generating Zero Touch Provisioning ("ZTP") links.

In some embodiments, the topology graph includes a plurality of nodes, each of the plurality of nodes representing one of the devices in the computing network. In some embodiments, the nodes are connected by edges, each of the edges representing one link. In some embodiments, the at least one server includes a Network Deployment System ("NDS"), and a Dynamic Host Configuration Protocol ("DHCP") server.

Various embodiments are described herein, including methods, systems, non-transitory computer-readable storage media storing programs, code, or instructions executable by one or more processors, and the like.

The foregoing, together with other features and embodiments will become more apparent upon referring to the following specification, claims, and accompanying drawings.

DETAILED DESCRIPTION

Figure 1:
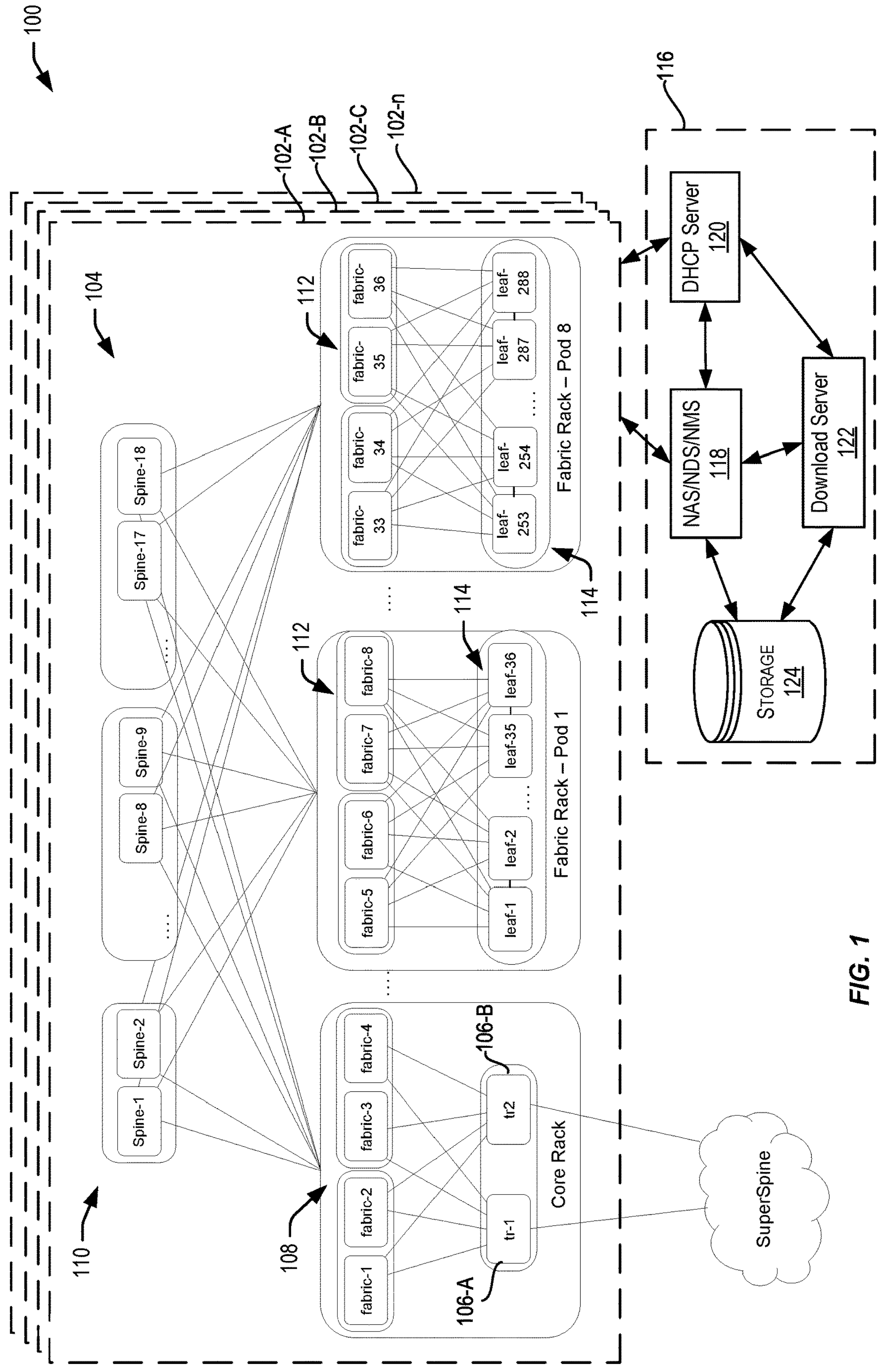
FIG. 1 depicts a simplified diagram of one embodiment of a network system.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A cloud services provider (such as Oracle Corporation of Redwood Shores, Calif.) may provide one or more cloud services that can be subscribed to by customers (or subscribers) of the offered services. In order to provide these services, the cloud services provider may run thousands of applications in its cloud infrastructure. These thousands of applications may be executed by hundreds (or even more) of servers and the applications and servers need to communicate and exchange data with each other in the provision of the cloud services. As part of its cloud infrastructure, a cloud services provider thus has to build a robust and scalable network (or multiple networks) that are scalable and provide seamless experience to the subscribers for the applications. For example, it is desired that such a network support application ("app") continuity, application fluency, application optimization, and the like.

Such networks are generally quite complex with potentially hundreds, or thousands, or even more components. A typical cloud network for a cloud services provider comprises multiple routers and switches that are responsible for routing and handling of traffic between applications executed by servers within the infrastructure of the cloud services provider. The servers may be spread across one of more data centers. These applications may include applications that are accessed by subscribers (clients) of the cloud services.

CLOS (or Clos or CLoS) topology-based networks are currently commonly used by cloud service providers to implement their networks. A CLOS network is a multi-tiered network (e.g., 2-tiered, 3-tiered, etc.) comprising of multiple devices organized into tiers or layers. Each tier comprises one or more switches or routers. Switches, routers, and devices are used interchangeably herein in the context of the computing network. Thus, a "device" in the computing network can be a switch or router. A CLOS network specifies a hierarchy of devices connected to backend servers that may be executing the applications. Clos networks are popular because they offer deterministic or informed latency all the way from where the packet enters the network from a server to when it leaves the network. A Clos network also offers redundancy and high availability.

For example, a 2-tiered CLOS network comprises:

(1) An edge layer where network traffic enters and exits the CLOS network. The edge layer comprises leaf devices that may be connected to servers that execute the cloud applications. The edge layer provides an entry point for network traffic originating from servers connected to the leaf devices to enter the CLOS network. The edge layer also provides an exit point for network traffic to leave the CLOS network to intended destination servers. The edge layer thus includes an ingress stage comprising devices where the network traffic enters the CLOS network, and an egress stage comprising devices from which the network traffic exits the CLOS network and is communicated to destination servers.

(2) An aggregation layer connected to the edge layer devices. The aggregation layer comprises one or more spine devices. Spine devices may use Data Center Interconnect (DCI) technology that is used to connect two or more data centers together over short, medium or long distances using high-speed packet-optical connectivity. The aggregation layer provides connectivity between the ingress stage of the edge layer and the egress stage of the edge layer. An edge leaf device may be connected to one or more spine devices.

In a 2-tiered CLOS network, for communication between servers (e.g., between applications executed by the servers) in an AD, a packet originating from a source server (e.g., originating from an application executed by the source server) may be received by a leaf device (of the ingress stage) connected to the source server. The ingress stage leaf device may then forward the packet to an appropriate spine device, which in turn may forward the packet to an egress stage leaf device. The egress stage leaf device may then forward the packet to a server that is executing an application that is the intended destination of the packet.

A 3-tiered CLOS network may include:

(1) An edge layer as described above.

(2) An aggregation layer as described above.

(3) A fabric layer comprising fabric devices. A fabric layer generally sits between the edge layer and the aggregation layer (i.e., provides connectivity between leaf devices of the edge layer and the spine devices of the aggregation layer). In certain configurations, fabric devices may also be connected to one or more transit routers ("TR") that provide connectivity between availability domains. A leaf device may be connected to one or more fabric devices. The fabric layer increases the scalability of a CLOS network. For example, in a particular setup, leaf devices may have 10 Gig ports and fabric devices may have 40 Gig ports. In this setup, four leaf device ports or interfaces can be connected to one fabric device port. A fabric device may be connected to one or more spine devices.

In a 3-tiered CLOS network, for communication between servers (e.g., between applications executed by the servers) in an AD, a packet originating from a source server (e.g., originating from an application executed by the source server) may be received by a leaf device (of the ingress stage) connected to the source server. The ingress stage leaf device may then forward the packet to an appropriate fabric device, which may in turn forward the packet to a spine device. The spine device may then forward the packet to a fabric device, which in turn forwards the packet to an egress stage leaf device. The egress stage leaf device may then forward the packet to a server that is executing an application that is the intended destination of the packet.

For example, a cloud services provider may have cloud infrastructure in a particular region (e.g., San Jose). The infrastructure may spread across multiple buildings and multiple floors of a building. Each building may represent an availability domain ("AD"). Within a building, each floor of the building may host a subset of the cloud applications, and a floor may communicate with another floor using DCI spine devices. One building may talk to another building via a transit router (TR). Within an AD (i.e., within a building) a CLOS network may be set up and used for enabling communications and data exchanges between servers in that building.

The setting up and management of cloud networks (e.g., CLOS networks) is a difficult, tedious, and time consuming process because the setting up and management tasks are currently done manually. For each network, components of the network generally have to be individually configured and/or provisioned. For example, each leaf device has to be configured including allocating a host name to the leaf device that is recognizable by DNS (Domain Name Server) and DHCP (Dynamic Host Configuration Protocol) (e.g., hostname.oracle.com), specifying VLANs, IP addresses, VRFs (virtual routing and forwarding), interfaces, etc. The information stored and used by the DNS and DHCP servers also has to be updated for each device. As the size and scale of a cloud network increases or changes, network set-up and management becomes a big headache. For example, imagine having to configure and manage a network comprising thousands or even more of devices in a CLOS network. To further complicate matters, the individual devices, for example, the leaf devices can be from different vendors with each vendor having its own unique way of configuring its devices. A network administrator thus has to learn all these different ways of configuring devices for different vendors.

As described herein, techniques are described for automating the network configuration and management of a computing network such as a cloud network through a centralized location as well as the automated provisioning and/or configuration of devices within the computing network. The techniques include enabling the network to be defined using a network model. The model encapsulates information related to the network, such as the network topology (e.g., whether the network is a 2-tier, 3-tier, or n-tier network), network hierarchy, identification of components (e.g., various devices) of the network, characteristics/features and configurations for components of the network, and the like. This model can be ingested and used for the automatic creation and/or configuration of the computing network. The techniques described herein can further include techniques for Zero Touch Provisioning ("ZTP")—techniques for provisioning devices and/or switches in the computing network without human intervention. This ZTP can be performed for some or all devices within all or portions of the computing network, including, in some embodiments, all of a computing network of an availability domain. This ZTP can include linking names of device positions within configuration files, identifying a triggering device for provisioning, determining links between the triggering device and neighbor devices, identifying a configuration file for the triggering device based on the links between the triggering device and neighbor devices, and downloading the configuration file to the triggering device.

FIG. 1 is a schematic illustration of one embodiment of a network system 100. The network system 100 can comprise one or several computing networks 102. In some embodiments, these computing networks can be arranged into one or several units such as, for example, one or several realms, regions, availability domains, or the like. In some embodiments, an availability domain can comprise one or several computing networks 102. Some or all of the computing networks 102 comprising a network of devices 104. In some embodiments, the network of devices 104 can comprise a 3-tiered Clos network having a spine-and-leaf architecture as depicted in FIG. 1.

The network of devices 104 includes transit routers 106-A, 106-B. The network of devices 104 can include any desired number of transit routers 106 including, for example, 1 transit router 106, 2 transit routers 106, 3 transit routers 106, 4 transit routers 106, 5 transit routers 106, 10 transit routers 106, 20 transit routers 106, 50 transit routers 106, 100 transit routers 106, 200 transit routers 106, 500 transit routers 106, between 1 and 20 transit routers 106, between 20 and 100 transit routers 106, between 100 and 500 transit routers, and/or any other or intermediate number of transit routers 106. The transit routers 106 can be connected via first fabric devices 108 to spine devices 110, which spine devices 110 can be connected via second fabric device 112 to leaf devices 114.

One or several computing networks 102 are connected with server 116. Server 116 can comprise one or several servers and can administer and/or manage the one or several computing networks 102. The server 116 can, as depicted in FIG. 1, include: Network Automation Server ("NAS")/Network Deployment Server ("NDS")/Network Management Server ("NMS") 118, also referred to herein as NAS 118, NDS 118, or NMS 118; Dynamic Host Configuration Protocol ("DHCP") server 120; download server 122; and storage 124, also referred to herein as topology database 124, which topology database 124 can be an SQL database such as, for example, a SQLite database. In some embodiments, server 116 can further include a DNS server. In some embodiments, the DNS server can maintain one or several IP address tables.

The NAS 118 can be a component, embodied in hardware or software, which can be communicatingly coupled to one or several of the computing networks 102. In some embodiments, the NAS 118 can be embodied as one or several computing devices and/or servers that are communicatingly coupled to one or several of the computing networks 102. In embodiments in which the NAS 118 is embodied in software, NAS 118 can be one or several applications. The NAS 118 can administer and/or control one or several aspects of operation and/or configuration of the one or several computing networks 102 and/or of one, some, or all of the devices in the one or several computing networks 102. In some embodiments, NAS 118 can provide network device provisioning, policy enforcement, security lock-down, software management, and compliance reporting. In some embodiments, the NAS 118 can manage and/or deploy independent components and/or devices within the one or several computing networks 102.

The DHCP server 120, which can operate according to DHCP or according to BOOTSTRAP Protocol ("BOOTP"), can be embodied in hardware or software and can be communicatingly coupled to the one or several computing networks 102. In some embodiments, the DHCP server 120 be communicatingly coupled to devices within the one or several computing networks 102. The DHCP server 120 can communicate with the one or several computing networks 102 and/or devices therein according to DHCP to assign Internet Protocol ("IP") addresses. In some embodiments, In some embodiments, the DHCP server 120 can assign a temporary IP address to a requesting, and in some embodiments, the DHCP server 120 can assign a permanent address.

The download server 120 can comprise files for downloading to components and/or devices of the one or several computing networks 102. These can include: one or several configuration files; and one or several pieces of executable code, which can be contained within one or several executable files which can include one or several executable scripts, event files, or the like.

The network system 100 can include storage 124, which storage can be part of server 116 or can be separate from server 116. The storage can comprise memory, and specifically can comprise any desired type or form of memory. In some embodiments, the storage 124 can comprise one or several databases including, for example, a link table, an interface table, a VLAN table, a DNS map, a device table, a locations table, and a VRF table. The storage 124 can further comprise a configuration file database. Some or all of these tables can be populated with information generated, calculated, and/or gathered during operation of the network system 100.

The device table can include information relating to devices within the computing networks 102. This information can include the device name and the device type—the roll of the device within the computing network 102. The device table can further include: device DNS names, identification of peer devices, a list of interfaces for each device, location of the device in the computing network 102, network parameters for the device, the IP addresses for the device, and device settings such as whether the device is enabled, if the device is included in a virtual chassis, and if the device is included in the virtual is chassis, the devices role in the virtual chassis. In some embodiments, data within the device table can be organized as shown below:

| Device Name | Device Type (Tr/Spine/ fabric/Leaf) and Device Id | DNS name | Peer Device | List of Interfaces | Device location | Network parameters (BGP keys) | IP Addresses of Mgmt and gateway | Device settings i)Enabled ii)Vc_role |
|---|---|---|---|---|---|---|---|---|

The interface table can include information relating to interfaces contained within the computing network 102. These interfaces can be located on devices in the computing network 102, and these interfaces can be identified, in association with their device, in the list of interfaces in the device table. The interface table can, for some or all of the interfaces identified in the device table, include further information for those interfaces. This information can include, for example, interface name, and interface identifier and/or an associated link identifier, Maximum Transmission Unit ("MTU") for the interface, hostname associated with the interface, IP addresses for the interface, a VLAN list, and a status identifier that can, for example, indicate if the interface is enabled. In some embodiments, data within the interface table can be organized as shown below:

| Interface Name | Interface id and Link Id | Mode Aggregate Virtual VC-Port | MTU IP/Ethernet/MPLS/ipv6 | Hostname | IP addresses | Vlan_list | Enabled |
|---|---|---|---|---|---|---|---|

The link table can include information relating to one or several links between devices within one or several of the computing networks 102. This information can include an identifier for a link, properties of the link, devices and/or interfaces coupled by the link, connected hostnames, and whether an indicator of whether the link is enabled. In some embodiments, data within the link table can be organized as shown below:

| Link Name | Link Id | List of Two Interfaces | Link Properties (Speed) | Hostnames connected | Enabled |
|---|---|---|---|---|---|

The VRF table can include information relevant to virtual routing and forwarding. This can include, for example, name of the VRF, a route distinguisher, a list of export route-targets, a list of import route-targets, identification of BGP peers, and Routing Information Protocol (RIP) settings. In some embodiments, data within the VRF table can be organized as shown below.

| Name | Route Distinguisher | RT Export | RT Import | BGP Peers | Interfaces | RIP settings |
|---|---|---|---|---|---|---|

Figure 2:
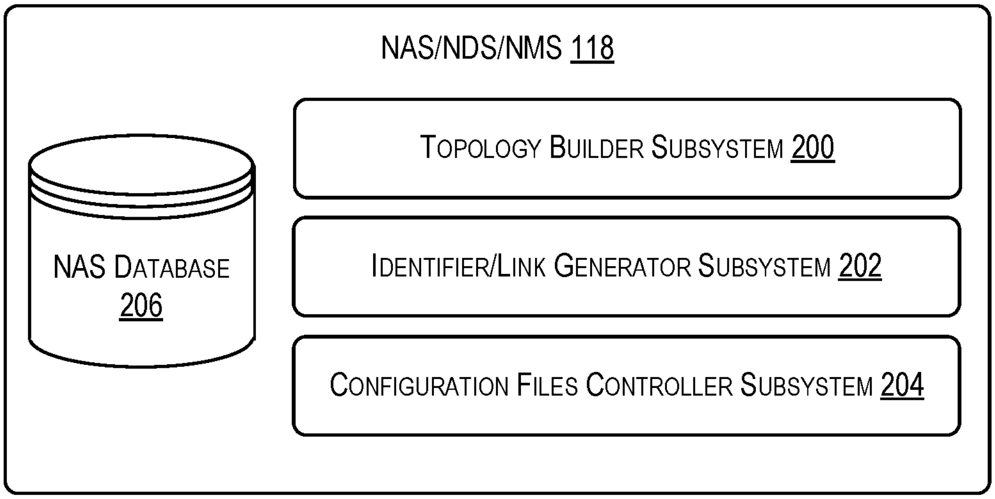
FIG. 2 is a simplified functional diagram of one embodiment of a Network Automation Server/Network Deployment Server/Network Management Server.

FIG. 2 is a functional schematic of one embodiment of NAS 118. As seen in FIG. 2, the NAS 118 can include a topology builder subsystem 200, a link identifier/link generator subsystem 202, a configuration files controller subsystem 204, and a NAS database 206.

The topology builder subsystem 200 can be embodied in hardware or software within the NAS 118. The topology builder subsystem 200 can identify a topology of the computing network 102 and/or generate a topology characterizing a desired computing network 102. This topology can, for example, identify devices within the computing network 102, the location of the devices within the computing network 102, links between the devices within the computing network 102, or the like.

The link identifier/link generator subsystem 202 can be embodied in hardware or software within the NAS 118. The link identifier/link generator subsystem 202 can identify and/or generate one or several links between components and/or devices within the computing network 102. In some embodiments, the link identifier/link generator subsystem 202 can populate all or portions of the storage 124, and specifically, can populate all or portions of the interface table and/or the link table.

The configuration files controller subsystem 204 can be embodied in hardware or software within the NAS 118. The configuration files controller subsystem 204 can identify configuration files relevant to different devices within the computing network 102. This can include maintaining up-to-date firmware files, generating configuration files including, for example, a generic configuration file for one or several devices and/or device types, and/or a specific configuration file applicable to one or several locations within the computing network 102. The configuration files controller subsystem 204 can store identified and/or generated configuration files to the configuration file database in the storage 124.

The NAS database 206 can be a subset of the storage 124 and/or can be distinct from the storage 124. In some embodiments, the NAS database 206 can include one or several databases or tables containing information used or generated by any of subsystems 200, 202, 204.

Automated Network Modeling, Set-Up, and Management

In some embodiments, the network system 100, and specifically the server 116 can generate model information, consume the model information, and automate the set-up and management of the network. In some embodiments, this can be performed by the NAS 118. In such embodiments, the NAS 118 can consume the model information, and based upon the model information, the NAS 118 automates the performance of tasks for setting up and managing the network. In certain embodiments, the model information is vendor-agnostic, i.e., does not depend upon a vendor providing a particular network component. The NAS 118 acts as the single administrative system for setting up and managing the network using the model information. In certain embodiments, one NAS 118 is provided for each CLOS network, and in some embodiments, a single NAS 118 can service multiple CLOS networks.

In certain embodiments, the network is modeled using a format or representation that network administrators can easily understand, edit, and update. In certain embodiments, the model is implemented using YAML. As part of specifying the model, the network topology (e.g., 2-tiered, 3-tiered), the various devices that form the network, hierarchical relationships between the devices, configurations for the devices, and the like, can be specified in the network model. The model information may be stored in one or more files. For example, the network model may comprise multiple YAML specification files corresponding to the different network device types (e.g., host, leaf device, fabric device, spine device). The entire network can be modeled (in a vendor-agnostic way) using one or more YAML files. In certain embodiments, a hierarchy is defined in the model. For example, YAML files corresponding to the various device types may be hierarchically related to each other. Accordingly, the network model for a network may specify the network topology, individual components of the network, and characteristics of components (e.g., specify interfaces, which are enabled/disabled, number of leaf devices, number of spine devices, number of fabric devices, etc.). One or more ADs can be modeled.

As an example, in a YAML file for a leaf device type, multiple different model types may be identified corresponding to leaf devices from multiple vendors. For example, a user may input vendor and model in yam file as follows: (1) Vendor and Model definition at global level yam file (fabric definitions) which treat all devices of the given role with given vendor and model; (2) Vendor or Model definition in a host specific yam file will overwrite the global definitions.

In certain embodiments, a group can be specified in the model to bundle the specified devices as single group for automation purpose and parameters defined in the group will be applied on all the devices listed in the group.

Global->Top level YAML (for all devices, settings will be applied)

Group->For group of devices (settings applied from group definitions file and they will overwrite global settings)

Host->For single leaf/spine/fabric/tr/dci (Settings are applied on single device and they will overwrite global and group settings)

Granularity of settings are in the order mentioned above.

Given a model for a network, a centralized NDS 118 is provided that consumes or reads the model information and automatically configures the network based upon the specified model information. Configuring the network may include deriving the specified topology of the network and setting up the network according to the specified topology, and configuring individual devices at multiple layers of the network. The configuring may include setting up links or connectivity between the various devices at the same or different layers of a CLOS network (e.g., links between leaf devices and fabric devices), specifying the interfaces, updating DNS and DHCP servers, and the like. In certain implementations, one NDS 118 is provided per CLOS network. The NDS 118 can have connectivity to all the devices in the CLOS network. In certain implementations, the NDS 118 may host the DNS server and/or DHCP server 120. The network model along with the NDS 118 thus simplify the process of configuring the managing cloud networks.

The modeling and the configuring based on the model can be performed in a vendor agnostic way. As a result, when a new leaf device is to be added to the network, the network administrator may simply update the model to include the new leaf device, connect the device to the existing network and power up the device, and upon power up, the configuration of the device is automatically performed by the NDS 118 based upon the updated model information.

In the examples described in this disclosure, YAML is used for specifying network model information. YAML is a human friendly data serialization format or language. While the network models described herein use YAML, this is not intended to be limiting. Various other modeling languages may be used in alternative embodiments. The network is modeled such that network engineers or administrators of the network can fine tune objects (e.g., components) of (or within) the network through a single administrative system. This disclosure describes an effective way of modelling cloud networks to achieve automation, scale, and seamless management.

In certain embodiments, a network is implemented using a CLoS (or Clos or CLOS) network topology. A cloud provider's cloud infrastructure may include multiple instances of such CLOS networks. For example, a cloud provider may host data centers globally and the data centers may be implemented using one or more CLOS network instances. In certain implementations, one or more data centers may be built per domain (or region). The challenge here is to manage the global CLoS Networks from a single administrator point of view so as to achieve huge scale and minimize human intervention.

In certain embodiments, a CLOS network comprises of an overlay network (lead devices) and an IP Fabric (core of CLOS network). The IP Fabric may comprise of DCI (Data Center Interconnect), TR (transit router), Spine and Fabric devices which may use protocols such as MPLS (Multi-Protocol Label Switching) or L3 (IPv4 or IPv6) for packet switching. The overlay network may comprise leaf devices connecting to the servers. Mostly, the overlay uses MPLS, VXLAN or other well-known tunneling techniques for the applications to communicate. A model is used to represent both the overlay and the IP fabric to manage the topology, links, interfaces, loop back interfaces and manage the IP addresses and tracking and VRFs (virtual routing and forwarding) on the network.

In order to achieve the objectives mentioned above, a model is defined for specifying a hierarchy and instance of the CLOS network. Once a given CLOS network instance is identified, an inventory of subsequent elements like DCI, TR, Spine, Fabric and lead devices is built along with physical network topology.

Figure 3:
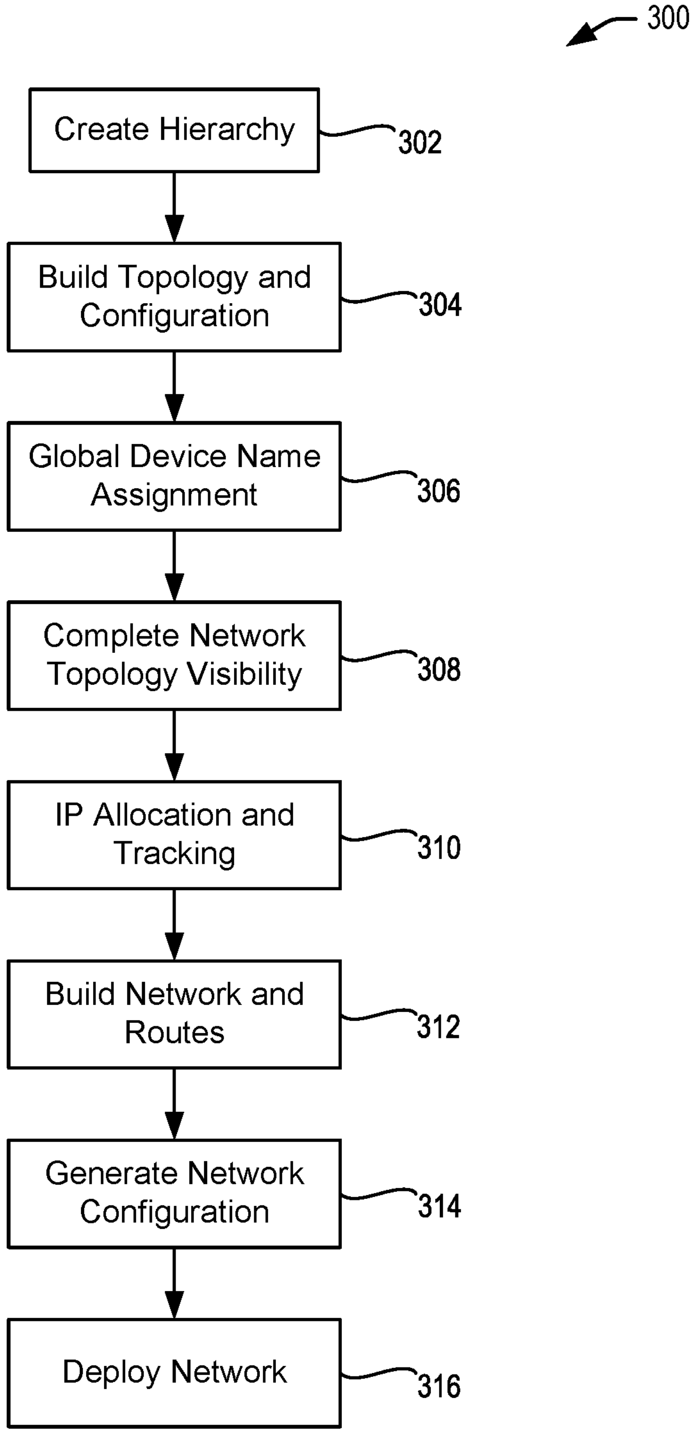
FIG. 3 is a flowchart illustrating one embodiment of a process for automated network modelling, set-up, and management.

In certain embodiments, for a CLOS network instance, the NDS is configured to perform processing as shown in FIG. 3, a flowchart illustrating one embodiment of a process 300 for automated network modelling, set-up, and management. The process 300 can be performed by network system 100, and/or by server 116 in connection with one or several computing networks 104. In some embodiments, the process 300 can be performed by NDS 118.

The process 300 begins at block 302, wherein a hierarchy for the network is created and/or identified. This hierarchy can identify the relative position of devices within the computing network 102. With this hierarchy, at block 304 a topology and configuration is built. This topology and configuration can be built for underlay and/or overlay levels of the computing network 102 and can include IP fabric and racks. At block 306 global device names are assigned to devices in the computing network 102. At block 308, network topology visibility is completed. This can include the creation of a physical cable map, graphs, links, and individual interfaces. At block 310 IP addresses are allocated and tracked for the devices in the computing network 102. At block 312 the computing network 102 and communication routes within the computing network 102 are built. At block 314, the configuration is generated for the computing network 102, and at block 316, the computing network 102 is deployed.

The following sections below provide further details, including description of algorithms being used, for each of the process steps identified above to manage the cloud networks.

Hierarchy Creation

In this step of the processing, a hierarchy is created to define a CLOS network instance. In some embodiments, the creation of the hierarchy can include the iterative determining of the position of a device within the computing network 102 until the position of a desired some or all of the devices in the computing network 102 have been determined. In some embodiments, determining the hierarchy of the computing network 102 can include determining tiers within the computing network 102, and determining the tier to each devices in the computing network 102 belongs.

Figure 4:
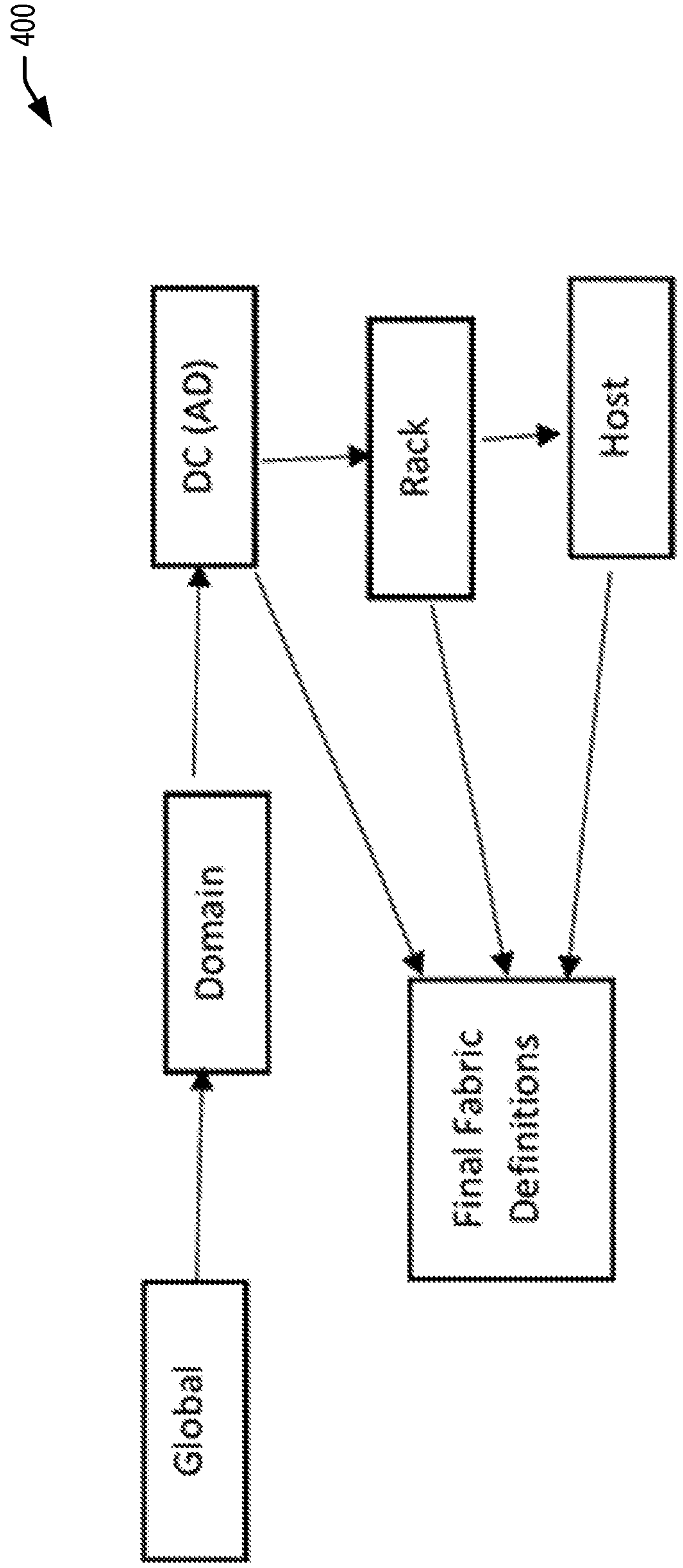
FIG. 4 is a depiction of one embodiment of an exemplary hierarchy.

The setting of the networks in the hierarchy are defined. If defined, a child level setting overrides the parent object settings in the hierarchy, otherwise the parent object settings would be propagated to all child objects. FIG. 4 is a depiction of one embodiment of an exemplary hierarchy 400.

Apparatus for Topology Building

In this step of the processing, the entire fabric topology is modelled, for example, in a fabric definitions file using a language such as YAML, where the fabric definition specifies where the topology, number of spine, fabric and leaf devices along with their models are specified. The fabric definitions file may also include active and inactive devices lists and also specify how to calculate the network topology.

A sample fabric definition file is shown below:

Fabric Definitions

```
---
unit:
  snmp_location: "US Salt Lake City UCF slc1 c1u1"
  # denotes cage and unit
  name: c1u1
  # First 10 addresses are reserved
  ipv4_mgmt_net: 10.69.132.0/22
  ipv4_mgmt_gateway: 10.69.132.1
  fabric_type: ThreeTier
  # Split up over the various tiers. This is just handy
  # loopback pool
  loopbacks: 172.16.84.0/22
  # point to point link pool
  links: 172.22.64.0/18
  # Currently only BGP (assumption is multi-protocol & BGP-LU)
  routing: bgp
  tr_asn: 794
  spine_asn: 64949
  fabric_asn: 64948
  leaf_asn: 794
```

-continued

Fabric Definitions

```
  flow_collectors:
  - ip: 10.69.135.224
    port: 6343
    flow_type: sflow
  - ip: 10.69.135.225
    port: 2055
    flow_type: netflow
# Transit router definition
tr:
  vendor: juniper
  enabled: all
  active: all
  model: mx960
  fabric_100g: True
  uplinks:
    - id: 0
      name: et-0/0/2
    - id: 1
      name: et-0/1/2
    - id: 2
      name: et-1/0/2
    - id: 3
      name: et-1/1/2
  interfaces:
    - id: 0
      name: et-0/0/2
    - id: 1
      name: et-0/1/2
    - id: 2
      name: et-1/0/2
    - id: 3
      name: et-1/1/2
# Spine device definition
spine:
  enabled: 1,10
  active: 1,10
  vendor: juniper
  model: qfx10002-72q
#Fabric device definition
fabric:
  # 'enabled' allows us to deploy only a select list of fabrics.
  enabled: 1-2, 5-6, 9-10
  active: 1-2, 5-6, 9-10
  vendor: juniper
  model: qfx10002-72q
  fabric_100g: True
  # Divides each linecard into groups
  interface_groups: 4
#Leaf device definition
leaf:
  # 'enabled' allows us to deploy only a select list of leaves.
  enabled: 1-6, 31-42
  active: 1-6, 31-42
  vendor: juniper
  model: qfx5100-48-6q
  redundant: True
  # Are TOR Virtual Chassis - True/False
```

Rack Definitions

This file contains VLAN and VRF definitions for leaf devices. Sample file contents are shown below.

```
---
###### External Compute - Guest
racks:
### 1 rack number
- name: r513
  switches:
##### 2 leaves per TOR
  - slc1-c1u1-leaf-1
  - slc1-c1u1-leaf-2
  vrfs:
#####################################################################
### Nimbula guest rack
  - name: isp-vr
    rd: 794:001001001
    rt_import:
    - 794:001001001
    # Security VRF
    - 794:115050101
    # Legacy ISP-VR
    - 7160:001001001
    rt_export:
    - 794:001001001
    # Legacy ISP-VR
    - 7160:001001001
    vlans:
    - vlan_id: 10
      name: us11-ispvr-v10
      l3info:
        ipv4:
          addr:
########### Dom0 subnet
          - 10.69.156.1/26
########### Instance subnet
          - 10.106.0.1/19
#         dhcp_relay:
########### Admin rack dhcp relay
      ports:
      - name: xe-0/0/0-35
      - name: xe-1/0/0-35
      rip_enabled: True
      rip_networks:
      - 100.73.0.0/18
      - 139.185.192.0/18
#####################################################################
# Port Descriptions
# RackLayouts: Compute X6-2 LS
  ports:
  - name: xe-0/0/0
    description: "compute-u2"
  - name: xe-0/0/1
    description: "compute-u3"
  - name: xe-0/0/2
    description: "compute-u4"
  - name: xe-0/0/3
    description: "compute-u5"
```

Host File (Example Shown Below)

This file contains model information specifying the characteristics for a network component that is a host device.

```
---
interfaces:
- description: slc1-c1u1-dci-1
  ipv4_addr:
  - 192.168.37.1/31
  mode: l3
  mpls_enabled: true
  name: ae0
  parent: None
  subint: 0
  type: 'aggregate'
  bfd_neighbor: 192.168.37.0
- description: slc1-c1u1-dci-2
  ipv4_addr:
  - 192.168.37.5/31
  mode: l3
  mpls_enabled: true
```

-continued

```
  name: ae1
  parent: None
  subint: 0
  type: 'aggregate'
  bfd_neighbor: 192.168.37.4
- description: slc1-c1u1-dci-1 - Hu0/0/0/0
  mode: aggregate
  mpls_enabled: true
  name: et-0/0/5
  parent: ae0
  subint: 0
  type: 'physical'
- description: slc1-c1u1-dci-2 - Hu0/0/0/0
  mode: aggregate
  mpls_enabled: true
  name: et-0/1/5
  parent: ae1
  subint: 0
  type: 'physical'
```

-continued

```
ss_bgp:
- address: 192.168.37.0
  as_number: 64947
  enabled: true
  name: slc1-c1u1-dci-1
  type: ss
- address: 192.168.37.4
  as_number: 64947
  enabled: true
  name: slc1-c1u1-dci-2
  type: ss
edge_bgp:
- address: 192.168.36.8
  as_number: 794
  enabled: true
  name: slc1-c1u1-ilr-1
  type: edge
- address: 192.168.36.9
  as_number: 794
  enabled: true
  name: slc1-c1u1-ilr-2
  type: edge
```

Builder Process (Example)

Figure 5:
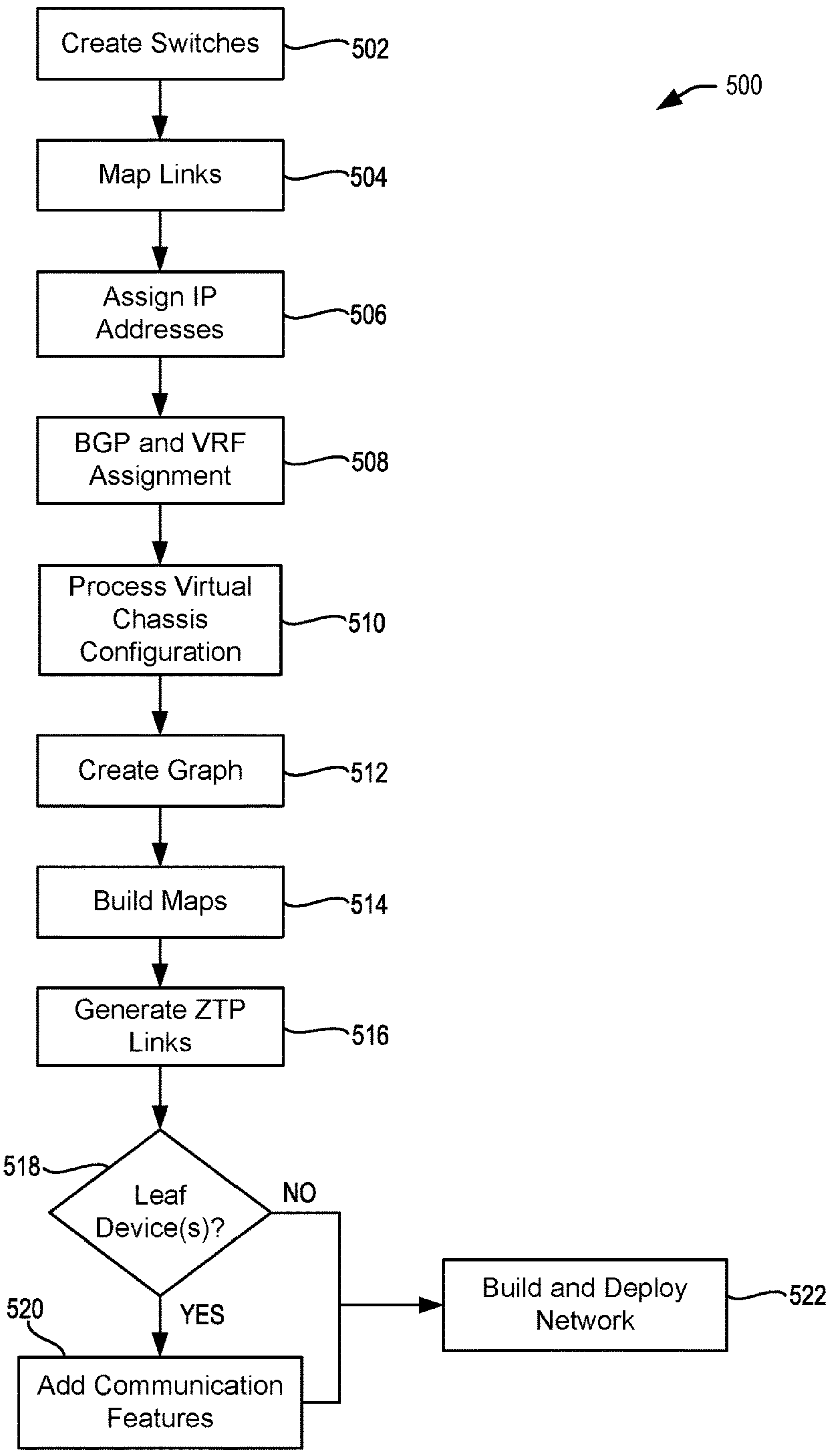
FIG. 5 is a flowchart illustrating one embodiment of a process for automating network setup based upon model information.

FIG. 5 is a flowchart illustrating one embodiment of a process 500 for automating network setup based upon model information according to certain embodiments. The process 500 can be performed by network system 100, and/or by server 116 in connection with one or several computing networks 104. In some embodiments, the process 500 can be performed by NDS 118. The NDS 118 reads the model information for a network and then performs the tasks shown below in process 500.

The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel.

The process 500 begins at block 502, wherein switches are created. In some embodiments, the switches can be created at each layer and/or tier in the computing network 102. The creation of switches can, in some embodiments, include the counting of switches and the creation of a switch list. In some embodiments, creating switches at each layer in the computing network can include: determining a hierarchy of devices in the computing network, which hierarchy defines a plurality of tiers of the computing network and identifying devices within each tier of the computing network; computing a number of switches in each tier of the computing network; and adding a representation, such as a DNS name, of each of at least some of the identified devices to a device database. In some embodiments, adding a representation of each of the at least some of the identified devices to the device database can include: adding switch attributes; and adding a physical interface list.

At block 504, links are mapped. In some embodiments, each link connects to a device in the computing network 102, and specifically each link connects a pair of devices in the computing network 102. In some embodiments, the mapping of links can include the identification of links between devices in the computing network 102.

At block 506 IP addresses are assigned and/or allocated. In some embodiments, each device in the computing network 102 is allocated an IP address. A block 508 Border Gateway Protocol ("BGP") and Virtual Routing and Forwarding ("VRF") are assigned. In some embodiments, this can include the creation of BGP routing for one or both of an underlay network and an overlay network. A block 510 any virtual chassis configuration is processed.

At block 512 a graph is created, and specifically a topology graph of the computing network 102 is created. In some embodiments, this topology graph comprises a plurality of nodes, each of which nodes represents one of the devices in the computing network 102. In some embodiments, the nodes are pairwise connected by edges, each of which edges represents a link. In some embodiments, this topology graph reflects the hierarchy of the computing network 102.

At block 514 maps are built. These maps can include, in some embodiments, a DNS map and/or a cable map. At block 516, Zero Touch Provisioning ("ZTP") links are generated. In some embodiments, this can include, for each device in the computing network, receiving a configuration file corresponding to a unique name for the device. In some embodiments, this unique name can be generated at least in part based on directly linked devices. In some embodiments, directly linked devices can be identified according to communications exchanged via Link Layer Discovery Protocol ("LLDP").

At decision step 518 the presence of leaf devices in the computing network 102 is determined and leaf devices are identified. If there are leaf devices, and for the leaf devices, the process 500 proceeds to block 520, wherein communication features are added and/or coupled to those leaf devices. In some embodiments, these communications features can include at least one of: a virtual local area network ("VLAN"), VRF; a VLAN interface; and a VLAN port. After the communication features have been added to leaf devices at block 520, and for devices other than leaf devices after decision step 518, the process 500 proceeds to block 522, wherein the network is built and deployed.

Create Switches

Figure 6:
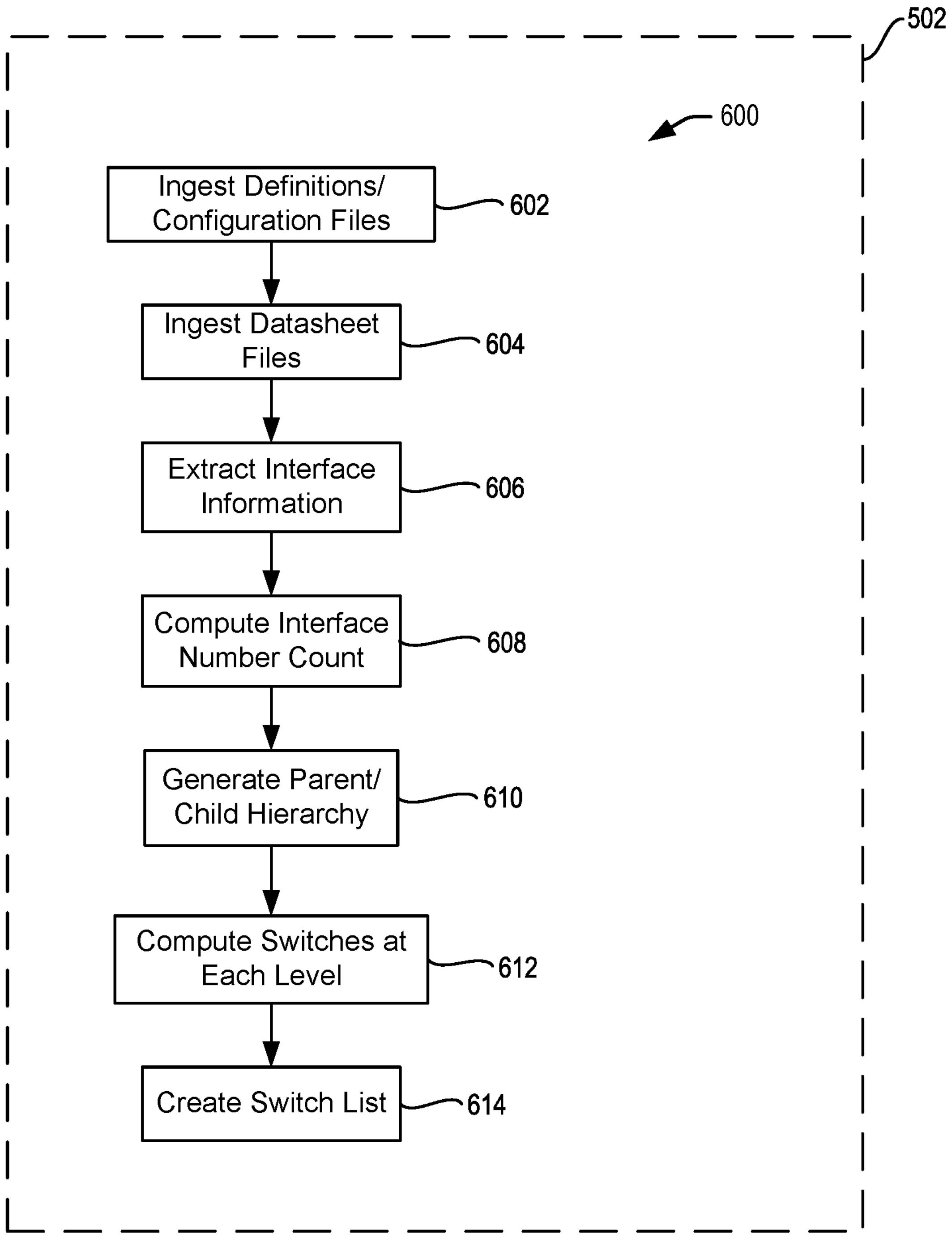
FIG. 6 is a flowchart illustrating one embodiment of a process for creating switches.

With reference now to FIG. 6, a flowchart illustrating one embodiment of a process 600 for creating switches is shown. The process 600 can be performed as a part of, or in the place of step 502 of FIG. 5. The process 500 begins at block 602, wherein definitions and configuration files are ingested. This can include ingesting the fabric definitions, the default fabric definitions, global, domain, data center, AD, rack, and/or host variable files.

At block 604, datasheet files are ingested. In some embodiments, this can include reading model datasheets from device library files, these model datasheets corresponding to devices in the computing network 102. From the datasheets, interface lists can be extracted as indicated in block 606, and, based on the interface list, an interface number count can be computed and interface identifiers can be determined as indicated in block 608.

At block 610, a parent/child hierarchy is generated. At block 612, the number of switches at each level is computed. At block 614, a switch list is created. One exemplary embodiment employing the process of FIG. 6 is shown below.

Hierarchy

If the computing network 102 has a 2-tier topology, then the hierarchy can be as follows:

Tr->Fabric->Spine->Fabric->Leaf

If the computing network 102 has a 2-tier topology, then the hierarchy can be as follows:

Tr->Fabric->spine->leaf

Compute Number of Switches at Each Level

If the topology is 3-tier (as 2-tier topology is a subset of 3-tier, 2-tier topology is not specifically addressed):

i) Transit Routers (From fabric-definitions file), n_tr (2 by default)

ii) Spine switches (n_spines): Number of fabric ports)/2 ii) pod_count=(number of spine ports/number of leaf Ports)

Pods are the smallest deployable units of computing iv) Fabric switches (n_fabrics): Number of leaf ports*pod_count v) If (transit routers are deployed)

Leaf switches (n_leafs): (Number_of_Fabric_ports/2)*(pods_count−1)

Else

Leaf switches (n_leafs): (Number_of_Fabric_ports/2)*(pods_count)

Create Switch List

After each layer switch counts are computed, create switches at each layer (tr, spine, fabric and leaf) as follows.

i) Read enabled switch list, active switch list and inactive switch list from Fabric-definitions. If a switch is part of inactive list, skip the switch from topology building of steps 5 below.

ii) Generate the switch host name (<DC>.<unit>.<switch type>_<switch number> iii) Generate DNS domain name <hostname>.<AD>.oraclecloud.com

Example

All host names are in lowercase.

The format of hostnames for all devices can be as follows:

<domain)-(dc>)-(uxxx))-<role>##(a/b)(−###(d))

Domain is the geographic complex identifier—3 digits max and should match the first 3 letters of the Building Code (dc)—data center identifier (uxxx)—Optional component for unit number where xxx is the unit number and letter "u" is a constant. This is only used in leaf and spine deployments and denotes the unit the device belongs too.

role—can be up to a 5 character acronym for the device role (this can be of variable length).

(a/b) is for devices providing a master backup device in which only 1 can forward traffic at any given time (e.g., firewalls and load balancers)

(−###(d)) is for indicating the number within a stack of stackable switches (think 3750 stacks), starting with a 1 slc1-c1u1-dci-1.usdc11.oraclecloud.com
slc1-c1u1-ilr-2.usdc11.oraclecloud.com
slc1-c1u1-tr-1.usdc11.oraclecloud.com
slc1-c1u1-tr-2.usdc11.oraclecloud.com iv) Add attributes to the Switch (vendor, model, hostname, dnsname, type v) Add switch to the device database.

vi) Assign an index to the switch equal to its location in the tier.

vi) For each switch, create interface groups attribute to the value specified in fabric definition.

vii) Read the physical interface list from device library and create a physical interface list for the device.

viii) Add the "id" specified in the interface file in the device library to the interface entry.

ix) Add the interface list to device in device DB.

x) Add interface list to interface DB and Map each interface to the parent switch. Maintain the container mapping for each interface, i.e. to which host (device) the interface belongs to.

Map Links

Figure 7:
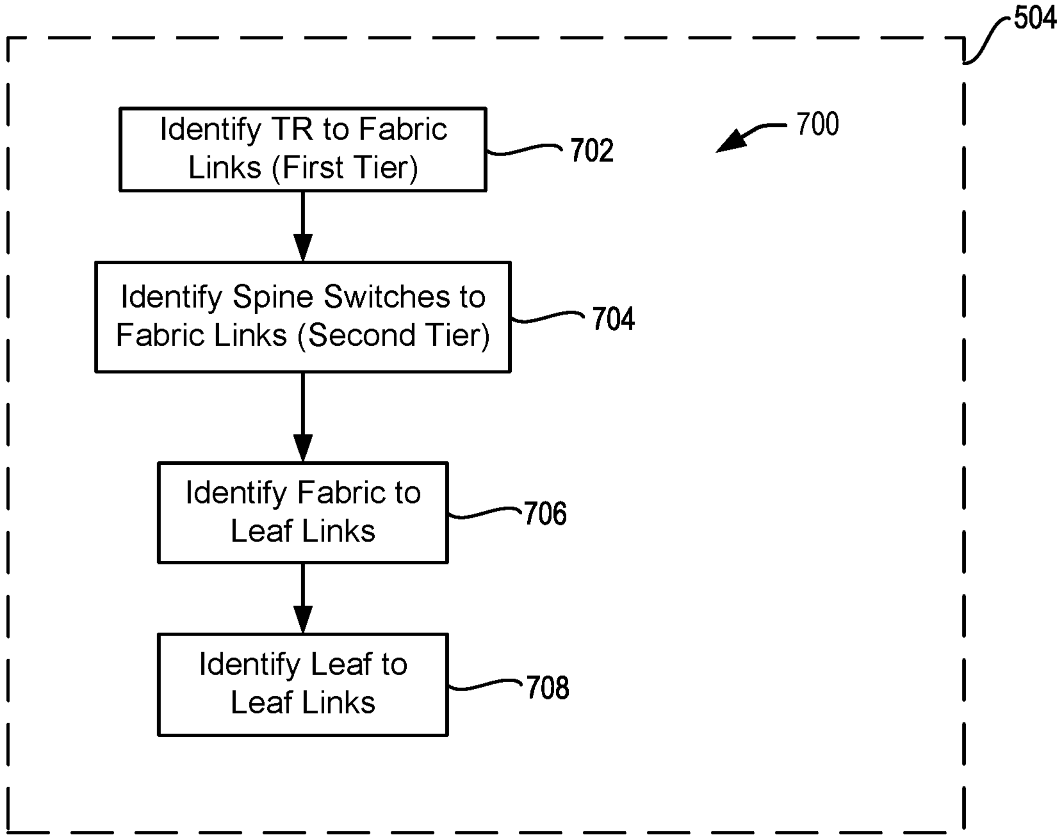
FIG. 7 is a flowchart illustrating one embodiment of a process for mapping links.

With reference now to FIG. 7, a flowchart illustrating one embodiment of a process 700 for mapping links is shown. The process 700 can be performed as a part of, or in the place of step 504 of FIG. 5. The process 700 begins at block 702, wherein Transit Router ("TR") to fabric links are identified and/or created. At block 704, links from spine switches to fabric switches are identified and/or created. At block 706, links from the fabric to leaf are identified and/or created. At block 708, links from leaf to leaf are identified and/or created. In some embodiments, identification of links from leaf to leaf can further include identifying peer links between leaf devices. In some embodiments, each of these links can be assigned a link identifier, and the link identifier can be stored in the link table. In some embodiments, this can be performed as outlined below:

Leaf switches (n_leafs): (Number_of_Fabric_ports/2)*(pods_count)

Transit Router to Fabric Switches (First Tier)

i) Get the number of transit routers=n_tr ii) Read the fabric-definitions file and read the uplinks from transit router to fabric switch, this can be called n_tr_uplinks iii) Number of fabric_switches to be used n_fabrics=n_tr_uplinks)

iv) Take the fabric switched from 0 . . . n_fabrics v) Generate a link from each fabric switch to each tr router as follows:

Take current fabric switch index, fabric_id

Take the fabric interface from 0 to (n_tr-1)

Connect these to each tr switch in n_tr list, interfaces in the uplink list indexed by fabric_id Assign a link id to the links generated Add the two interfaces as link vertices Validate link specific settings on this link. Assign same settings to both the interfaces on the interfaces.

Spine Switches to Fabric Switches (Second Tier)

i) Connect the even interface on the fabric switches to each interface on spine switches.

ii)

a) For each spine switch, obtain the spine_switch_index b) Then for each fabric switch, obtain the fabric_switch_index Get the interface on the spine switch interface list using fabric_switch_index Get the interface from even interface list on the fabric using spine_switch_index Example if spine_switch_index is 3 and fabric_switch_index is 5 spine3[5] will be connected to fabric5[6]

In general: spine3[0]<->fabric0[6]
spine3[1]<->fabric1[6]
spine3[2])->fabric2[6]
fabric0[0]<->spine0[0]
fabric0[2]<->spine1[0]
fabric0[4]<->spine2[0]

Using the algorithm, create a link between spine and fabric interfaces

Generate a unique link id called link_id. Use ID generation module which keeps track of used and used link ids.

Assign link_id to fabric interface

Assign link_id to spine interface

Validate link specific settings on this link. Assign same settings to both the interfaces on the interfaces.

Fabric to Leaf i) From the configuration, read the uplinks desired from leaf to fabric=n_leaf_uplinks ii) Derive fabric_offset=(if transit router deployed) ? (n_fabrics−1): 0 iii) leaf counter=0 iv) For each leaf no in n_leafs:

For each uplink no in n_leaf_uplinks: { fabric_id=(uplink no*leaf no)+fabric_offset

On the fabric device with given fabric_id, get the interface from odd interface list on the fabric using index leaf counter Get the leaf interface from uplink and id Create link (leaf interface, fabric interface)

Increment leaf counter

Leaf to Leaf i) Read configuration and check if the leafs deployments, i.e. virtual-chassis, redundancy or standalone ii) For each leaf is leaf switch list:

If leaf is virtual chassis:

a) Set up the even leaf leaf1 (leaf_no) as virtual chassis master.

b) setup immediate odd leaf leaf2 (leaf_nov+1) as virtual chassis backup.

c) Mark both leafs as peers.

d) Read the peer_link interface list from the fabric-definitions file.

e) create a link between peer interfaces and assign the link id.

f) Mark the interfaces as vc-port https://www.juniper-.net/documentation/en_US/junos/topics/reference/commandsummary/request-virtual-chassis-vc-port-uplink.html g) The traffic on the vc-ports are dedicated for vccp (virtual chassis control plane), i.e to interconnect the members of Virtual chassis.

Otherwise, if the leaf has redundancy enabled a) Starting with leaf index 0 and 1, create an aggregate leaf of 2 members. Repeat this for Subsequent leafs in the list b) Both members are primary.

c) Read the peer_link interface list from the fabric-definitions file.

d) create a link between peer interfaces and assign the link id.

e) Mark the link as “aggregate” which sets the interface mode to “aggregate”

f) Create a parent aggregate interface ae0. Add the interfaces mentioned in the peer links Under aggregate parent ae0 on both leafs.

g) On the parent interface ae0 on both leaves set the interface mode to trunk configure the vlan list as all configure native vlan (vale id 999) so that traffic between the members Is accepted without a vlan tag h) On both the leafs:

Configure IRB interface on native vlan (vlan id 999) https://www.juniper.net/documentation/en_US/junos/topics/topic-map/irb-andbridging. html set the interface type to virtual set the interface mode to l3

Figure 8:
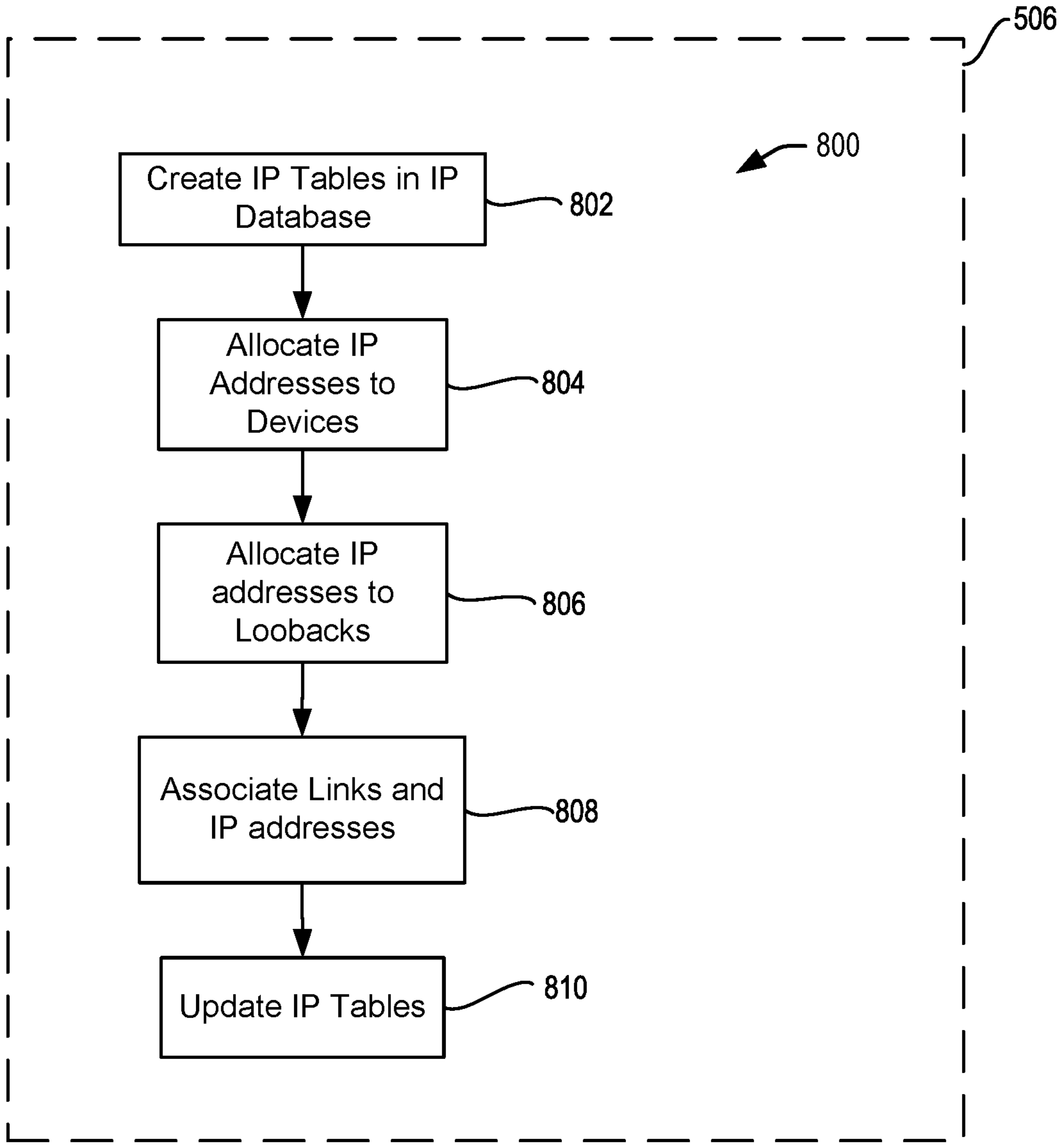
FIG. 8 is a flowchart illustrating one embodiment of a process for assigning IP addresses.
Figure 9:
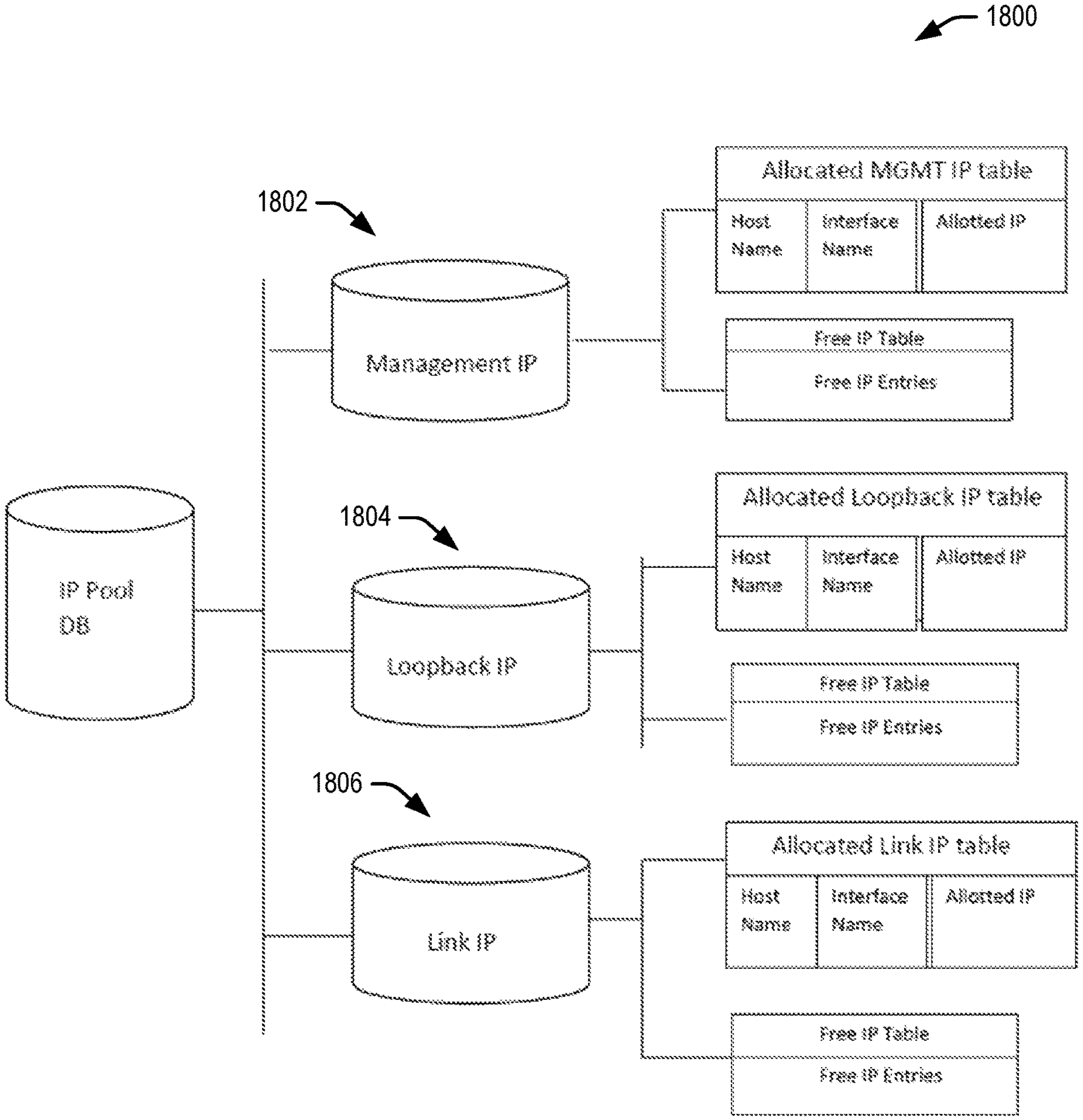

It will allow traffic to be routed among vlans i) Create a link between IRB interface created on both the leafs Assign IP Addresses WM With reference now to FIG. 8, a flowchart illustrating one embodiment of a process 800 for assigning IP addresses is shown. The process 800 can be performed as a part of, or in the place of step 506 of FIG. 5. The process 800 begins at block 802, wherein IP tables in the IP database are created. In some embodiments, these tables can be created as depicted in the database structure 1800 shown in FIG. 9. As shown, this database structure 1800 can include a management IP table 1802 containing management IP address information, a loopback IP table 1804 containing loopback IP address information, and a link IP table 1806 containing link IP address information. At block 804, IP addresses are allocated to devices in the network of devices 104. At block 806, IP addresses are allocated to loopbacks. At block 808, IP addresses are allocated to links, and at block 810, IP tables, such as the IP tables 1802, 1804, 1806 in the database structure 1800 can be updated. In some embodiments, updating these tables can include, storing IP addresses allocated to devices in the management IP table 1802, storing IP addresses allocated to loopbacks in the loopback IP table 1804, and storing IP addresses allocated to links in link IP table 1806. In some embodiments, this can be performed as outlined below:

The IP pool can be specified for links and Loopbacks from the private network range (172.16.0.0/12

Private-Use Networks [RFC1918]).

Functional Specifications

Loopbacks will take as the next available/23 range from 172.16.0.0/23->172.16.238.0/23 (120 L&S Max)

Links should be taken as the next available/19 range from 172.17.0.0/19->172.31.224.0/19 (15*8=120 L&S Max)

IP address tracker will keep track of IP assigned from the pool described above and assign the IPs based on interface type.

Each link would be assigned a /31. Note that we are planning to do away this requirement in the future by asking our vendors to support “IP unnumbered” for the network links. In addition to that we need about 22k loopback addresses—each a /32.

Generate the list of DNS names/IP mapping for adding the new devices/interfaces into the cloud DNS server IP Allocation Algorithm We assign each of the IP pools to IP DB. The IP DB further expands to two tables, one is assigned IP table and other one is free IP address tables.

Initialize all the entries in allocated IP Pool to the free IP table entries.

Management IP Address Allocation i) For each device, invoke the vendor plugin to return the management interface name.

ii) Assign free_mgmt_ip database table to management network pool ii) Assign one IP from free_mgmt_ip to the device management ip.

iii) Add the IP to the "in_use" management network ip database table.

iv) Remove the IP from free_mgmt_ip database table

Loopback IP Allocation i) For each device, invoke the vendor plugin to return the loopback interface name.

ii) Assign free_lo_ip database table to loopback ip pool entries ii) Assign one IP from free_lo_ip to the device loopback interface.

iii) Add the assigned IP to the "in_use" looback ip database table.

iv) Remove the IP from free loopback ip database table

Link IP Address Allocation i) For each link, obtain both interface names that are part of the link.

ii) Assign free_link_ip database table to link ip pool entries iii) If any of the interfaces in the link do not have "aggregate" or "vc-port" as the mode:

a) Assign Two IPs from free_link_ip database to each of interface that are part of the link b) Add the two IPs from the "in_use" link ip database table.

c) Remove the IP from free_link_ip database table d) Enable "mpls" or "tunneling" on the link interface.

VRF and BGP Assignment

Figure 10:
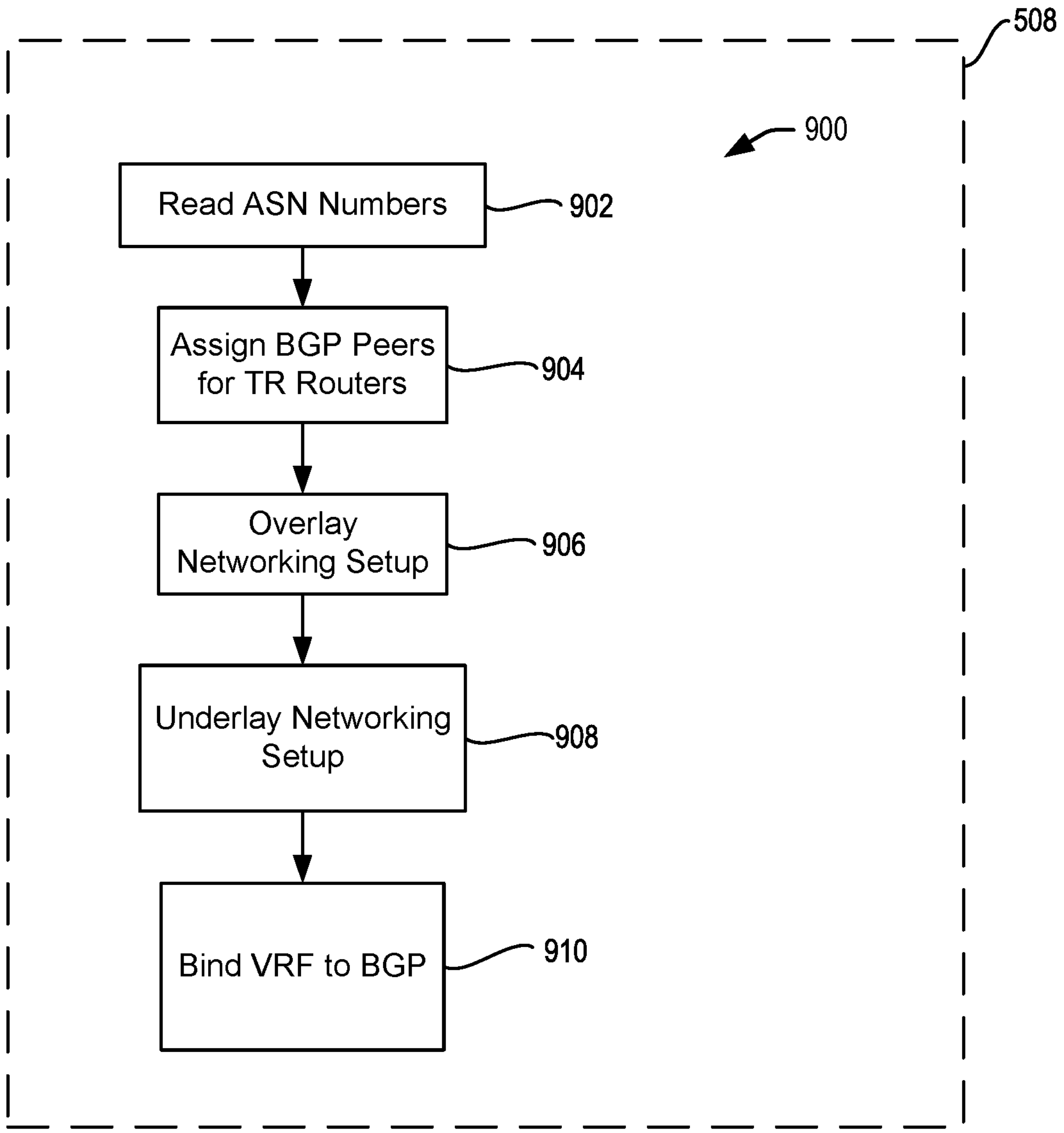
FIG. 10 is a schematic illustration of one embodiment of a database structure for IP address information.

With reference now to FIG. 10, a flowchart illustrating one embodiment of a process 900 for VRF and BGP assignment is shown. The process 900 can be performed as a part of, or in the place of step 508 of FIG. 5. The process 900 begins at block 902, wherein Autonomous System Numbers ("ASN") are assigned. In some embodiments, the ASN can facilitate in the control of routing within the computing network 102. At block 904 BGP peers are identified and/or assigned for the TR routers. At block 906, the overlay network is setup, and at block 908, the underlay network is setup. At block 910, VRF and BGP are bound. In some embodiments, this can be performed as outlined below:

Functionality

A route distinguisher (RD) is an address qualifier used only within a single ISP's MPLS network to distinguish the distinct VPN routes of separate customers who connect to the provider.

Has only one purpose: to make IPv4 prefixes globally unique.

Example RD Prefix

America: ORD12 (011), . . . , CGY3(112)

EMEA: AM2/AM3 (202), . . . , FRA8 (204)

APAC: SY3 (301), . . . , MEL11 (303)

The example RD usage is illustrated in the "Rack File" section.

BGP Routing Setup (Underlay and Overlay)

1. Read the ASN number for tr, fabric, spine and leaf from fabric-definitions.

2. For tr routers, i) For each other tr router in tr_list ii) Take loopback ip addresses of the remote tr routers assigned in previous step.

iii) Assign that loopback ip as a bgp_peer of current tr router iv) Store the BGP peers in database 3. Overlay networking setup The overlay consists of "leaf, fabric, spine and tr" towards fabric facing (non-server and nonsuper-spine) interfaces.

I) For each device:

A) For interfaces which part of valid links (super spine and serve facing interfaces doesn't have links)

B) Obtain the peer interface on the link, and peer hostname

C) Obtain the IP address of peer interface

D) Configure the IP and hostname as BGP peer of current device

E) Store the BGP peer in the database.

4. Underlay networking setup

Underlay consists of tr routers and leaf routers.

i) Get the tr_list.

ii) For each tr in tr_list:

A) Obtain the loopback ip of the tr

B) Store the loopback ip and tr device name in tr_bgp_peer_list iii) Get the leaf list iv) or each leaf in leaf list:

A) Obtain the loopback ip of the leaf

B) Store the loopback ip and leaf device name in leaf_bgp_peer_list v) On each tr, configure all the entries in leaf_bgp_peer list as bgp_peers.

vi) On each leaf, configure all the entries in tr bgp_peer list as bgp_peers.

5. Read the vhf name and settings from the configuration file.

i) Assign all fabric participating interfaces to vrfs ii) Assign the Route Distinguished, rt import and rt export to the VRF.

iii) Bind the VRF to BGP so that BGP can advertise the routes to BGP peers.

The BGP Peers built on each device will get network routing info learnt by the switch.

Create Graph

Figure 11:
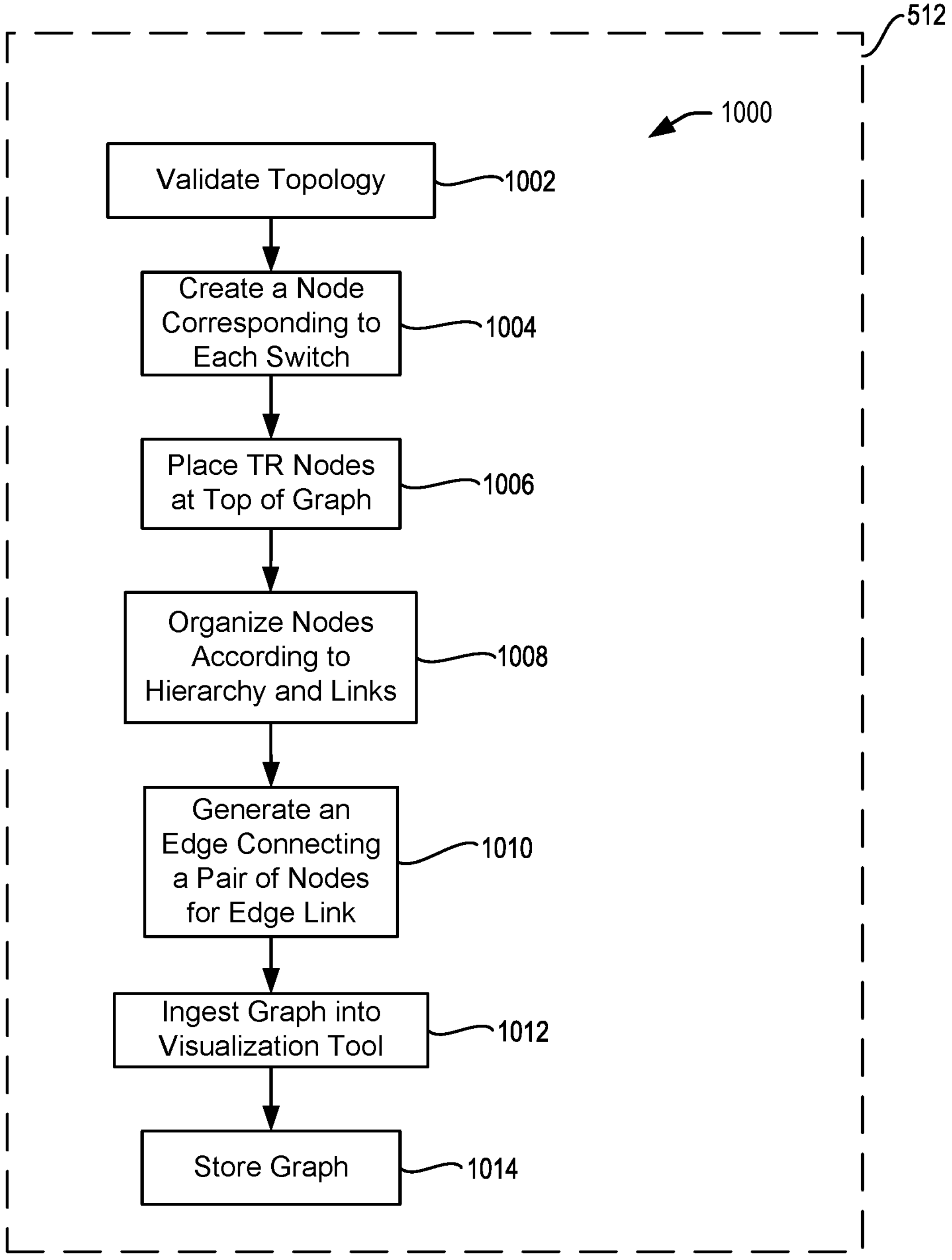
FIG. 11 is a flowchart illustrating one embodiment of a process for VRF and BGP assignment.

With reference now to FIG. 11, a flowchart illustrating one embodiment of a process 1000 for creating a graph is shown. The process 1000 can be performed as a part of, or in the place of step 512 of FIG. 5. The process 1000 begins at block 1002, wherein the topology is validated. At block 1004, a node corresponding to each switch in the computing network 102 is created. At block 1006, nodes corresponding to the TR routers are placed at the top of the graph. At 1008, the remaining nodes are organized according to the hierarchy of the computing network 102 and the links between devices. At block 1010, edge are generate connecting nodes. In some embodiments, each edge represents a link, and each edge connects a pair of nodes. At block 1012, the graph is ingested into a visualization tool, which visualization tool generates a visual form of the graph, also referred to herein as the topology graph. At block 1014, the graph, and in some embodiments, the topology graph is stored in the topology database. In some embodiments, this can be performed as outlined below:

Topology Graph Creation

Once all links are created, create a graph as follows.

i) Check and validate the topology ensure proper switch count at each layer of the CLOS network peer links are configured on leafs uplinks are configured on tr and leaf devices Sufficient ports are available (from device capability files) to create the topology ii) All switches as nodes of the graph iii) Transit Routers are the top nodes of the graph iii) All links as edges of the graph iv) Return the graph for the visualization tool.

v) Save the graph in the SQLite database under respective tables.

The automation system writes the inventory of all the devices in a "clos-inventory" file in a format required by ansible, so that ansible can further manage the file.

Network engineers or network administrators maintain the order and connect specific links from upstream devices to downstream devices and vice versa. For example, in a three-tier topology, four leaf devices can be connected to one fabric device. The four fabric facing ports of Leaf1 can get connected to the first four interfaces of the fabric, Leaf2 to the next four interfaces of the fabric, . . . and so on. The automation is supplied with the vendor and model of each of the device types and the symmetric connectivity specifications. The automation systems can build a symmetric map of the topology with the YAML files supplied above. A device library may be supplied which contains the model specific device interface lists and the automation auto creates interfaces and links using the device library.

Sample leaf device with server and fabric facing interface dictionary is mentioned below. In certain embodiments, the automation system uses the interfaces in the order to generate the topology.

```
File: qfx5100-36q.yaml
--
device:
  function: switch
  vendor: juniper
  model: qfx5100-48-6q
  ports: 54
  linecards: 0
  initial_linecard: 0
  asics: 0
  initial_asic: 0
  port driver: xe
  uplink_driver: et
  interfaces:
    - id: 0
      name: xe-0/0/0
    - id: 1
      name: xe-0/0/1
    - id: 2
      name: xe-0/0/2
    - id: 3
      name: xe-0/0/3
    - id: 4
      name: xe-0/0/4
    - id: 5
      name: xe-0/0/5
    - id: 6
      name: xe-0/0/6
    - id: 7
      name: xe-0/0/7
    - id: 8
      name: xe-0/0/8
    - id: 9
      name: xe-0/0/9
    - id: 10
      name: xe-0/0/10
    - id: 11
      name: xe-0/0/11
    - id: 12
      name: xe-0/0/12
```

-continued

```
    - id: 13
      name: xe-0/0/13
    - id: 14
      name: xe-0/0/14
    - id: 15
      name: xe-0/0/15
    - id: 16
      name: xe-0/0/16
    - id: 17
      name: xe-0/0/17
    - id: 18
      name: xe-0/0/18
    - id: 19
      name: xe-0/0/19
    - id: 20
      name: xe-0/0/20
    - id: 21
      name: xe-0/0/21
    - id: 22
      name: xe-0/0/22
    - id: 23
      name: xe-0/0/23
    - id: 24
      name: xe-0/0/24
    - id: 25
      name: xe-0/0/25
    - id: 26
      name: xe-0/0/26
    - id: 27
      name: xe-0/0/27
    - id: 28
      name: xe-0/0/28
    - id: 29
      name: xe-0/0/29
    - id: 30
      name: xe-0/0/30
    - id: 31
      name: xe-0/0/31
    - id: 32
      name: xe-0/0/32
    - id: 33
      name: xe-0/0/33
    - id: 34
      name: xe-0/0/34
    - id: 35
      name: xe-0/0/35
    - id: 36
      name: xe-0/0/36
    - id: 37
      name: xe-0/0/37
    - id: 38
      name: xe-0/0/38
    - id: 39
      name: xe-0/0/39
    - id: 40
      name: xe-0/0/40
    - id: 41
      name: xe-0/0/41
    - id: 42
      name: xe-0/0/42
    - id: 43
      name: xe-0/0/43
    - id: 44
      name: xe-0/0/44
    - id: 45
      name: xe-0/0/45
    - id: 46
      name: xe-0/0/46
    - id: 47
      name: xe-0/0/47
    - id: 48
      name: et-0/0/48
    - id: 49
      name: et-0/0/49
    - id: 50
      name: et-0/0/50
    - id: 51
      name: et-0/0/51
```

-continued

- id: 52
  name: et-0/0/52
- id: 53
  name: et-0/0/53

Build Maps

Map building can include the generation of a DNS map and/or a cable map. In some embodiments, the building of a cable map can be combined with the mapping of links in block 504. Further details of the creation of cable maps are discussed at length above with respect to step 504 of FIG. 5. In some embodiments, map building can include the building of a DNS map. One embodiment of the creation of a DNS map is described below. In such an embodiments, the modelling system can setup the DNS server with the right entries to each of switches using the host FQDN Name. This can include the following steps:

1. After the IP address are allocated, take the following action.
2. Walk through the device list (tr, spine, fabric and leaf)
   i) Query the IP DB, management IP allotted table for IP address management interface on the device
   ii) print management IP and the device FQDN (host name+domain) in a file "dns.txt"
3. Append "dns.txt" to "/etc/hosts" of the given AD's DNS server The DNS server will resolve the device to management IP allotted and all devices can be reachable via DNS name.

ZTP Setup (In some embodiments, ZTP links can be setup and/or generated as described below.

The ZTP process consists of preparing ZTP for leafs, fabric and spines.

1. The automation software bootstraps a DHCP server either locally or remotely which can be reached by the switches in the network.
   On the DHCP server, all the device configuration files are copied under "/var/www/html/config/" directory.
   The switches can download the file from this folder via http using DHCP options.
2. Following is the algorithm to find the configuration file for a switch.
   i) Connect the Switches to the peer switches according to the topology and also connect them to management switch so they can reach DHCP sever.
   ii) Initially TR routers can be powered on and provisioned manually.
   Subsequently, spine, fabric and leaf devices can be powered-on in hierarchical order. The parent device can be powered-on in CLOS network hierarchy before powering on the children.
   The hierarchy can be as follows.
   <tr>-<fabric>-<spine>-<fabric>-<leaf>
   iii) The factory default configuration comes with ZTP (zero touch provisioning) enabled. ZTP uses DHCP internally.
   Each switch (in the pair in case of virtual chassis) independently broadcasts DHCP discover messages during boot up process and this message reach the DHCP sever which responds with all the needed info like configuration, firmware upgrade to etc.
   iv) DHCP server to allocate temporary IP address from the pool allocated to it to each of the switches.
   It will download initial configuration which enables LLDP on the Switch. The IP pool used by DHCP is different from the IP pools used by links, loopback or management IP above.
   v) On DHCP server, this automation process creates the symbolic link to given configuration file by encoding its location information in the configuration file name.
   The location information. Is encoded with the parent hostname and peer interfaces it's connected. This will help DHCP server in deriving correct configuration files which are stored in DHCP server.
   vi) Once LLDP is enabled, the switch will learn the parent hostname and peer interfaces it's connected.
   The switch can use the parent hostname and peer interfaces to identify and/or download a corresponding configuration file on the DHCP server.
   vii) The switches downloads corresponding configuration files from the DHCP server and the switches load those production configuration files and come online Build and Deployment The automation system will digest the Fabric definitions, rack and host file and generate the final configuration for all the devices in the CLOS topology. The host level settings take the highest precedence.

In certain embodiments, any change may require a configuration generation for the whole network. The automation system (e.g., NDS) auto propagates the change to all nodes that are affected and deploys the effected devices.

The embodiments described above provide several technical innovations over existing/conventional systems. For example, the fabric build process described above is new and applicable to any cloud network using a CLOS topology. The network administrators need not manage hostname or DNS. The automation will auto generate and auto populate the hostname and DNS maps. From a perspective of vendor agnostic network management, network administrators need not be aware of the vendor and do not directly operate on the device. Adding or deleting of devices is very easy by just editing the YAML model files. After devices are physically placed, they can be enabled in the YAML input files, build the config and push that to the given AD. The tasks associated with managing network links, like enabling or disabling of interfaces, power shut down of unused ports, and network and route management can be achieved by just changing the knobs defined in the YAML source files. The generated topology can be used by network visualization and network monitoring services for troubleshooting.

Automated Zero Touch Provisioning

ZTP, as disclosed herein, is one or several techniques for provisioning and management of network devices in a datacenter without manual intervention. These network devices can include some or all of the devices in a computing network 102. Techniques disclosed herein ease and facilitate deployment of devices in the computing network 102 by: automating the discovery of device image on system power-on (boot); and automatically provisioning the device configuration file.

Achieving ZTP for whole network has challenges. These challenges can become greater as the scale of the computing network increases, thus, one of the challenges in automating the operations of these network is to achieve ZTP of the entire network of the availability domain. Present techniques address these challenges through use of network topology and intelligence in identifying firmware image and configuration of a switch based on the location of that switch in the computing network 102.

In some embodiments, the network system 100, and specifically the server 116 can perform automated Zero Touch Provisioning ("ZTP"). In some embodiments, this can be performed by the server 116 in connection with the computing network 102. In some embodiments, automated ZTP can be performed by NAS 118 in connection with the computing network 102, and in some embodiments, automated ZTP can be performed, in connection with the computing network 102, by the NAS 118, the DHCP server 120, and the download server 122.

In some embodiments, the NAS 118 can: leverage capabilities of the DHCP server 120 and/or the download server 122 to enable the ZTP; create configuration files for some or all of the devices in the computing network 102; update the DHCP server 120 with the location of the configuration files; and create symbolic links to device configuration files based on device location information In some embodiments, when a device is powered on, the device can broadcast DHCP messages including the devices vendor and model name. This broadcasted information can allow the DHCP server to download a preliminary configuration file. LLDP can be enabled initially on the device, and can be used to gather information identifying linked devices. This information can define and/or identify a location of a device in the topology. The ZTP process further causes switches to upgrade to the latest firmware which can be contained on the download server 122, and to identify and download a configuration file.

Figure 12:
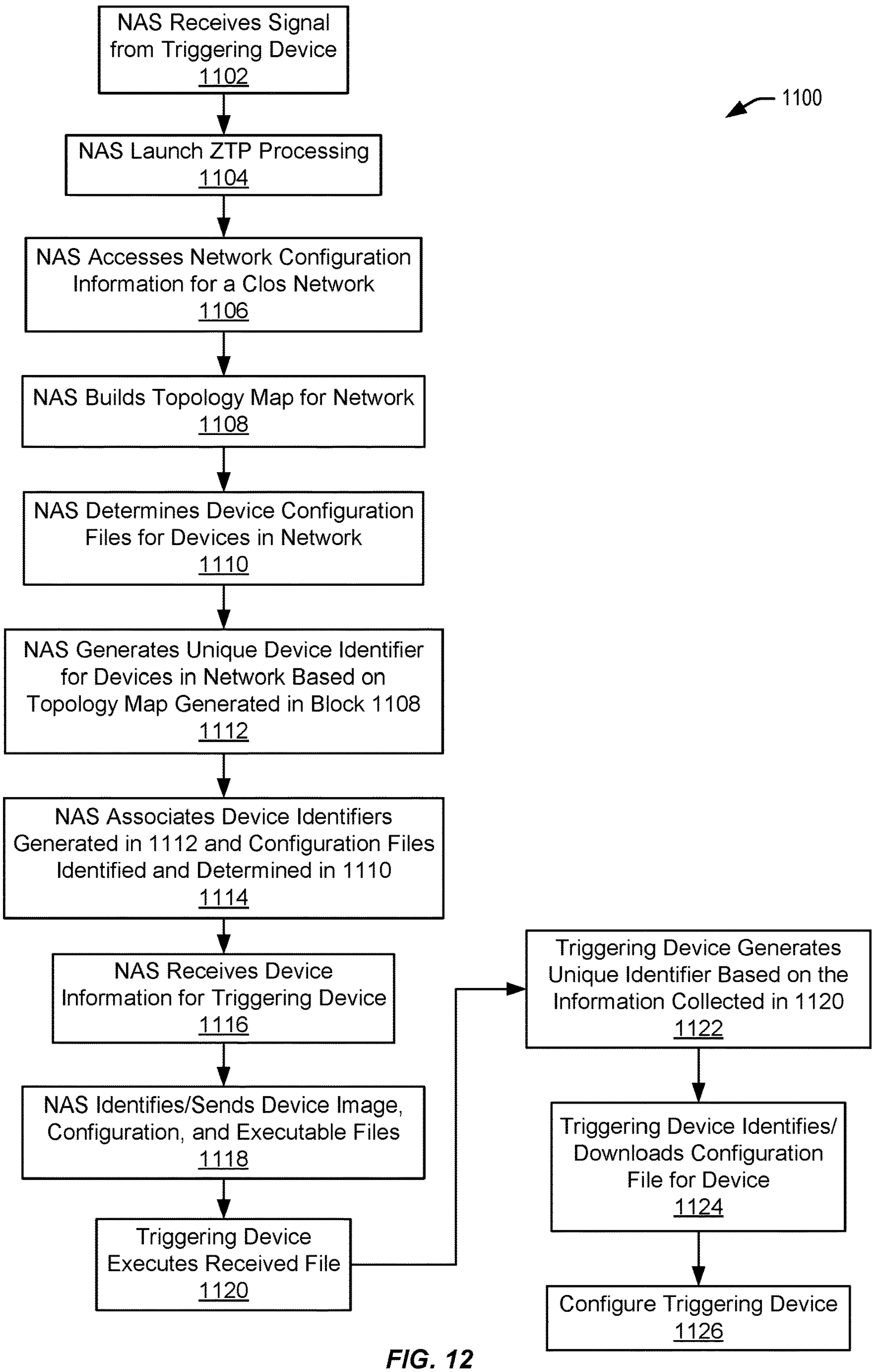
FIG. 12 is a flowchart illustrating one embodiment of a process for creating a graph.

With reference now to FIG. 12, a flowchart illustrating one embodiment of a process 1100 for ZTP. The process 1100 can be performed by network system 100, and/or by server 116 in connection with one or several computing networks 104. In some embodiments, the process 1100 can be performed by NAS 118. The NAS 118 reads the model information for a network and then performs the tasks shown below in process 1100. In some embodiments, the Transit Routers in the computing network 102 can be manually built, configured, and loaded.

The processing depicted in FIG. 12 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 12 and described below is intended to be illustrative and non-limiting. Although FIG. 12 depicts the various processing steps occurring in a particular sequence or order, this is not intended to be limiting. In certain alternative embodiments, the processing may be performed in some different order or some steps may also be performed in parallel.

The process 1100 includes steps 1106 through 1114, which relate to the generation of information and symbolic links for use in later steps of the ZTP process, and steps 1116 through 1126 which execute the configuration of one or several devices in the computing network 102 based on the information and/or symbolic links gathered and/or generated in steps 1106 through 1114. Although depicted as occurring after steps 1102 and 1104, and thus not as first steps in process 1100, steps 1106 through 1114 can be performed as first steps in process 1100.

The process 1100 begins at black 1102, wherein a signal from a triggering device is received. In some embodiments, the triggering signal can be received by the NAS 118, and in some embodiments, the triggering signal can be received by DHCP server 120. In some embodiments, this signal from the triggering device can be sent subsequent to the powering up of the triggering device. In some embodiments, the triggering device can power on when the triggering device is added to the computing network 102 or is rebooted. In some embodiments, the trigger device can be added to the computing network 102, via the insertion of the trigger device into a gap in a preexisting computing network 102. This gap can occur, for example, when a previous device is removed from a computing network 102. Alternatively, in some embodiments, the trigger device can be power on as a part of the creation of a new computing network 102.

In some embodiments, one, several, or all of the Transit Routers of the computing network 102 can be initially powered on and/or can be already powered at. Once the one, several, or all of the Transit Routers of the computing network 102 are powered, subsequent switches can powered on. In some embodiments, this can be order to a hierarchy of devices within the computing network 102, and specifically, the powering of the one, several, or all of the transit routers of the computing network 102 can be followed by powering and provisioning of switches in the following order: (1) Fabric Switches (core rack); (2) Spine switches; (3) Fabric Switches (Fabric rack); and (4) Leaf Switches. In some embodiments, at least one switch in a given rack must be powered at a given parent layer before powering on any of the child switches in the topology.

At block 1104 the ZTP process is launched. In some embodiments, the ZTP process can be launched in response to receipt of the signal from the triggering device. At block 1106, the NAS 118 accesses network configuration information for the computing network 102. In some embodiments, this can include reading the "fabric-definitions", AD definitions and vendor supplied data sheet files and creating a database, the CLOS-inventory, containing this information.

At block 1108, the NAS 118 builds a topology map for the network. In some embodiments, the topology map can be, at least in part, built based on network configuration information accessed in block 1106. This topology map can, in some embodiments, characterize devices and connections with the network of devices 104 and/or within the computing network 102. This topology map can, in some embodiments, characterize an existing computing network 102, or alternatively, can characterize a theoretical computing network 102 that has not yet been created. This can include creating a hierarchy of the CLOS topology. The hierarchy can be as follows: Transit Routers->Fabric Switches (Core Rack)->Spine Switches->Fabric Switches (Fabric Rack)->Leaf Devices. This can be followed by creating the links between devices as per the fabric definition file, below.

In some embodiments, the creation of the topology map can include the modelling of the entire fabric topology of the network of devices in a fabric definitions file using YAML syntax where the topology, number of spines, fabric and leaf devices along with their models are specified. This file can also contains active and inactive devices list and also tells how to calculate the network topology. The sample fabric definition file is as follows.

Fabric Definitions

---
unit:
snmp_location: "US Salt Lake City UCF slc1 c1u1"
# denotes cage and unit
name: c1u1
First 10 addresses are reserved
ipv4_mgmt_net: 10.69.132.0/22
ipv4_mgmt_gateway: 10.69.132.1
fabric_type: ThreeTier
Split up over the various tiers. This is just handy
loopback pool
loopbacks: 172.16.84.0/22
point to point link pool
links: 172.22.64.0/18
Currently only BGP (assumption is multi-protocol & BGP-LU)
routing: bgp
tr_asn: 794
spine_asn: 64949
fabric_asn: 64948
leaf_asn: 794
flow_collectors:
- ip: 10.69.135.224
port: 6343
flow_type: sflow
- ip: 10.69.135.225
port: 2055
flow_type: netflow
tr:
vendor: juniper
enabled: all
active: all
model: mx960
fabric_100g: True
uplinks:
- id: 0
name: et-0/0/2
- id: 1
name: et-0/1/2
- id: 2
name: et-1/0/2
- id: 3
name: et-1/1/2
interfaces:
- id: 0
name: et-0/0/2
- id: 1
name: et-0/1/2
- id: 2
name: et-1/0/2
- id: 3
name: et-1/1/2
spine:
enabled: 1,10
active: 1,10
vendor: juniper
model: qfx10002-72q
fabric:
'enabled' allows us to deploy only a select list of fabrics. This list is manually driven so get it right.
enabled: 1-2, 5-6, 9-10
active: 1-2, 5-6, 9-10
vendor: juniper
model: qfx10002-72q
fabric_100g: True
Divides each linecard into groups
interface_groups: 4
leaf:
'enabled' allows us to deploy only a select list of leaves. This list is manually driven so get it right!!
enabled: 1-6, 31-42
active: 1-6, 31-42
vendor: juniper
model: qfx5100-48-6q
redundant: True
Are TOR Virtual Chassis - True/False Fabric Builder Process 1. Read the Fabric Definitions, default fabric definitions, global, domain, dc, AD, rack, and hostvar files. Digest the configuration settings.

2. Read the model datasheets from device library files, extract the interface list. Compute the interface number count and each interface id from the interface list.

Parent Child Hierarchy

Create a parent->child hierarch as follows.

If topology is ThreeTier:

Tr->Fabric->Spine->Fabric->Leaf

Else if topology is two tier:

Tr->Spine->Leaf

Compute Number of Switches at each level (The remaining algorithm specifically relates to a 3-tier topology as a 2-tier topology is a subset of the 3-tier topology)

If the topology is Three tier:

i) Transit Routers (From fabric-definitions file), n_tr (2 by default)

ii) Spine switches (n_spines): Number of fabric ports)/2 ii) pod_count=(number of spine ports/number of leaf Ports) Pods are the smallest deployable units of computing iv) Fabric switches (n_fabrics): Number of leaf ports*pod_count v) If (transit routers are deployed)

Leaf switches (n_leafs): (Number_of_Fabric_ports/2)*(pods_count−1)

Else

Leaf switches (n_leafs): (Number_of_Fabric_ports/2)*(pods_count)

Creating the Switch List

After each layer switch counts are computed, create switches at each layer (tr, spine, fabric and leaf) as follows.

i) Read enabled switch list, active switch list and inactive switch list from Fabric-definitions. If a switch is part of inactive list, skip the switch from topology building of steps 5 below.

ii) Generate the switch host name (<DC>.<unit>.<switch_type>_<switch_number> iii) Generate DNS domain name <hostname>.<AD>.oraclecloud.com

Example slc1-c1u1-dci-1.usdc11.oraclecloud.com
slc1-c1u1-ilr-2.usdc11.oraclecloud.com
slc1-c1u1-tr-1.usdc11.oraclecloud.com
slc1-c1u1-tr-2.usdc11.oraclecloud.com iv) Add attributes to the Switch (vendor, model, hostname, dnsname, type v) Add switch to the device database.

vi) Assign an index to the switch equal to its location in the tier.

vi) For each switch, create interface groups attribute to the value specified in fabric definition.

vii) Read the physical interface list from device library and create a physical interface list for the device.

viii) Add the "id" specified in the interface file in the device library to the interface entry.

ix) Add the interface list to device in device DB.

x) Add interface list to interface DB and Map each interface to the parent switch. Maintain the container mapping for each interface, i.e. to which host (device) the interface belongs to.

Cable Map (Link) Formation

Transit Router to Fabric Switches (First Tier)

i) Get the number of transit routers=n_tr ii) Read the fabric-definitions file and read the uplinks from transit router to fabric switch, we call this as n_tr_uplinks iii) Number of fabric_switches to be used n_fabrics=n_tr_uplinks)

iv) Take the fabric switched from 0 . . . n_fabrics v) Generate a link from each fabric switch to each tr router as follows Take current fabric_switch_index, fabric_id Take the fabric interface from 0 to (n_tr-1)

Connect these to each tr switch in n_tr_list, interfaces in the uplink list indexed by fabric_id Assign a link id to the links generated Add the two interfaces as link vertices Validate link specific settings on this link. Assign same settings to both the interfaces on the interfaces.

Spine Switches to Fabric Switches (Second Tier)

i) Connect the even interface on the fabric switches to each interface on spine switches.

ii)

a) For each spine switch, obtain the spine_switch_index b) Then for each fabric switch, obtain the fabric_switch_index Get the interface on the spine switch interface list using fabric_switch_index Get the interface from even interface list on the fabric using spine_switch_index Example if spine_switch_index is 3 and fabric_switch_index is 5 spine3[5] will be connected to fabric5[6]

In general: spine3[0]<->fabric0[6]

spine3[1]<->fabric1[6]

spine3[2])->fabric2[6]

fabric0[0]<->spine0[0]

fabric0[2]<->spine1[0]

fabric0[4]<->spine2[0]

Using the algorithm, create a link between spine and fabric interfaces

Generate a unique link id called link_id. Use ID generation module which keeps track of used and used link ids.

Assign link_id to fabric_interface

Assign link_id to spine_interface

Validate link specific settings on this link. Assign same settings to both the interfaces on the interfaces.

Create Links Between Fabric and Leaf i) From the config, read the uplinks desired from leaf to fabric=n_leaf_uplinks ii) Derive fabric_offset=(if transit router deployed) ? (n_fabrics−1): 0 iii) leaf counter=0 iv) For each leaf_no in n_leafs:

For each uplink no in n_leaf_uplinks: {fabric_id=(uplink no*leaf_no)+fabric_offset On the fabric device with given fabric_id, get the interface from odd interface list on the fabric using index leaf_counter Get the leaf interface from uplink and id
Create link (leaf_interface, fabric_interface)
Increment leaf counter Create links between leaf to leaf i) Read configuration and check if the leafs deployments, i.e virtual-chassis, redundancy or standalone ii) For each leaf is leaf switch list:

If leaf is virtual chassis:

a) Set up the even leaf leaf1 (leaf_no) as virtual chassis master.

b) setup immediate odd leaf leaf2 (leaf_nov+1) as virtual chassis backup.

c) Mark both leafs as peers.

d) Read the peer_link interface list from the fabric-definitions file.

e) create a link between peer interfaces and assign the link id.

f) Mark the interfaces as vc-port https://www.juniper.net/documentation/en_US/junos/topics/reference/comma nd-summary/request-virtual-chassis-vc-port-uplink.html g) The traffic on the vc-ports are dedicated for vccp (virtual chassis control plane), i.e to interconnect the members of Virtual chassis.

Otherwise, if the leaf has redundancy enabled a) Starting with leaf index 0 and 1, create an aggregate leaf of 2 members. Repeat this for Subsequent leafs in the list b) Both members are primary.

c) Read the peer_link interface list from the fabric-definitions file.

d) create a link between peer interfaces and assign the link id.

e) Mark the link as "aggregate" which sets the interface mode to "aggregate"

f) Create a parent aggregate interface ae0. Add the interfaces mentioned in the peer_links Under aggregate parent ae0 on both leafs.

g) On the parent interface ae0 on both leaves set the interface mode to trunk configure the vlan list as all configure native vlan (vale id 999) so that traffic between the members Is accepted without a VLAN tag h) On both the leafs:

Configure IRB interface on native vlan (vlan id 999) https://www.juniper.net/documentation/en_US/junos/topics/topic-map/irb-andbridging.html set the interface type to virtual set the interface mode to l3

It will allow traffic to be routed among VLANs i) Create a link between IRB interface created on both the leafs Returning again to process 1100, at block 1110, configuration files are determined and/or generated for devices in the computing network 102. In some embodiments, the NAS 118 can generate configuration files based on the output of the fabric builder process. This determination and/or generation of configuration files includes the generation and downloading of a configuration file for each device in the computing network 102. Such a generated configuration files can be named as follows: <Switch FDDN Name>.conf. These configurations files are made accessible to DHCP server 120 and/or to the download server 122 in a standard directory programmatically by the automation software. In some embodiments, this can include downloading these configuration files to the DHCP server 120 and/or to the download server 122, and/or to the storage 124 at a location accessible by the DHCP server 120 and/or the download server 122. In some embodiments, these configuration files can be downloaded to the storage 124, and can be downloaded under a http downloadable folder named "/var/www/html/config."

In some embodiments, and as part of step 1110, the NAS 118 can retrieve firmware images, and specifically the latest firmware images for devices within the computing network 102. In some embodiments, the NAS 118 can retrieve the latest firmware images for devices in the computing network 102 from an Artifact Repository Manager, which can receive and manage firmware images. The NAS 118 can store the latest firmware images in the storage 124, and specifically in a portion of the storage 124 accessible by the DHCP server 120 and/or the download server 122. In some embodiments, the NAS 118 can store the latest firmware images in a table named "/var/www/html/images" in the storage 124.

In some embodiments, and as a part of step 1110, the NAS 118 can provide a provisional file, and the DHCP server 120 can further receive the provisional file, which provisional file can direct the DHCP server 120 to take actions in furtherance of the ZTP process. This DHCP definitions file can be compiled by the NAS 118 to generate a "dhcp.conf" file. Exemplary embodiment of each of the DHCP definitions file and the dhcp.conf file are shown below.

<u>DHCP definitions file</u>

```
---
dhcp:
  ipv4_mgmt_netmask: 255.255.254.0
  ipv4_mgmt_broadcast: 10.36.129.255
  # The DHCP server uses the IP range below to initially provision the
  management interface of the switches.
  ipv4_mgmt_dhcp_range: 10.36.129.180 10.36.129.247
  ipv4_mgmt_boot_servers:
  ndm-1: 10.36.129.254
  ndm-2: 10.36.129.253
# The firmware image for various switch models.
firmware:
  Juniper-qfx5100-48: "jinstall-qfx-5-flex-14.1X53-D35.3-domesticsigned.tgz"
  Juniper-qfx10002-36q: "jinstall-qfx-10-f-15.1X53-D36-domesticsigned.tgz"
  Juniper-qfx10002-72q: "jinstall-qfx-10-f-15.1X53-D36-domesticsigned.tgz"
```

<u>dhcp.conf file</u>

```
 #
 #
 # DHCP Server Configuration file.
 #   see /usr/share/doc/dhcp*/dhcpd.confsample
```

-continued

```
#   see 'man 5 dhcpd.conf'
#
ddn-update-style none;
option domain-name "usdc11.oraclecloud.com";
option domain-name-servers 10.193.9.102;
option domain-name-servers 10.160.204.54;
authoritative;
log-facility local7;
# Option 43
option space ZTP_OP;
option ZTP_OP.image-file-name code 0 = text;
option ZTP_OP.config-file-name code 1 = text;
option ZTP_OP.image-file-type code 2 = text;
option ZTP_OP.transfer-mode code 3 = text;
option ZTP_OP.alt-image-file-name code 4= text;
# Opengear options
option space opengear code width 1 length width 1;
option opengear.config-url code 1 = text;
option opengear.firmware-url code 2 = text;
# ServerTech options
option space servertech hash size 3;
option servertech.identifier code 1 = text;
option servertech.ztp-url code 2 = text;
default-lease-time 600;
max-lease-time 7200;
##########################################################################
#
# Device Classes
#
class "arista" {
match if substring(option vendor-class-identifier, 0, 6) = "Arista";
}
# classes - Cisco
class "cisco" {
match if substring(option vendor-class-identifier, 0, 5) = "Cisco";
}
# classes -juniper
# leaf
class "Juniper-qfx5100-48" {
  match if option vendor-class-identifier ~= "Juniper-qfx5100-48";
  vendor-option-space ZTP_OP;
  option tftp-server-name "10.69.135.254";
  option ZTP_OP.config-file-name "scripts/boot_juniper_5100.conf";
  option ZTP_OP.transfer-mode "http";
  option ZTP_OP.image-file-name "images/jinstall-qfx-5-flex-14.1X53-D47.3-
      domestic-signed.tgz";
}
# spine or fabric
class "Juniper-qfx10002-36q" {
  match if option vendor-class-identifier ~= "Juniper-qfx10002-36q";
  vendor-option-space ZTP_OP;
  option tftp-server-name "10.69.135.254";
  option ZTP_OP.config-file-name "scripts/boot_juniper_10k36.conf";
  option ZTP_OP.transfer-mode "http";
  option ZTP_OP.image-file-name "images/jinstall-host-qfx-10-f-15.1X53-D65.3-
      domestic-signed.tgz";
}
# spine or fabric
class "Juniper-qfx10002-72q" {
  match if option vendor-class-identifier ~= "Juniper-qfx10002-72q";
  vendor-option-space ZTP_OP;
  option tftp-server-name "10.69.135.254";
  option ZTP_OP.config-file-name "scripts/boot_juniper_10k72.conf";
  option ZTP_OP.transfer-mode "http";
  option ZTP_OP.image-file-name "images/jinstall-host-qfx-10-f-15.1X53-D65.3-
      domestic-signed.tgz";
}
class "Juniper-qfx10002-testcode" {
  match if option vendor-class-identifier ~= "Juniper-pvi-model";
  vendor-option-space ZTP_OP;
  option tftp-server-name "10.69.135.254";
  option ZTP_OP.config-file-name "scripts/boot_juniper_10k72.conf";
  option ZTP_OP.transfer-mode "http";
  option ZTP_OP.image-file-name "images/jinstall-qfx-10-f-flex15.1X53-D20.6-
      domestic-signed.tgz";
}
class "ncs-5500-ztp" {
  if exists user-class and option user-class = "iPXE" {
    filename = "http://10.69.135.254/images/nc55500-mini-x.iso-6.1.3";
```

-continued

```
    } else if exists user-class and option user-class = "exr-config" {
      filename = "http://10.69.135.254/scripts/ncs5k_ztp.sh";
    }
}
# Opengear devices
class "opengear-ztp" {
    match if option vendor-class-identifier ~~ " Opengear/";
    vendor-option-space opengear;
    option opengear.config-url
"http://10.69.135.254/scripts/opengear_ztp.sh";
    option opengear.firmware-url "http://10.69.135.254/images/im72xx-4.1.0u2.flash";
}
# ServerTech PDU devices
class "servertech-ztp" {
    match if option vendor-class-identifier ~~ " ServerTech/";
    vendor-option-space servertech;
    option servertechidentifier "STI Params";
    option servertech.ztp-url "tftp://10.69.135.254/configs/STIC-${mac}.ini";
}
# classes - hosts
class "iloms" {
    match if option vendor-class-identifier ~= "ILOM";
}
########################################################################
#
# Subnet Definitions
#
# Local cloudnet subnet to get dhcp to work
subnet 10.160.200.0 netmask 255.255.255.128 {
}
# ORD12 leaf & spine TEST
shared-network ad-oob-mgmt {
    subnet 10.69.132.0 netmask 255.255.252.0 {
      pool {
        range 10.69.135.0 10.69.135.131;
        option subnet-mask 255.255.252.0;
        option broadcast-address 10.69.135.255;
        option routers 10.69.132.1;
        option domain-name "usdc11.oraclecloud.com";
        allow members of "Juniper-qfx5100-48";
        allow members of "Juniper-qfx10002-36q";
        allow members of "Juniper-qfx10002-72q";
        allow members of "Juniper-qfx10002-testcode";
        allow members of "ncs-5500-ztp";
        allow members of "opengear-ztp";
      }
    }
}
```

Returning again to process 1100, at block 1112, a unique identifier is generated for devices in the computing network 102. In some embodiments, this unique identifier can be generated based on the unique topology map generated in block 1108, and/or based on the devices location in the computing network 102. In some embodiments, the NAS 118 can generate these unique identifiers. At block 1114, device identifiers generated in block 1112 are associated with configuration files identifier and determined in block 1110. In some embodiments, the association of these device identifiers with configuration files can be performed by the NAS 118, and can include the creation of symbolic links according to the exemplary algorithm below. The generation of this symbolic link can enable the unique identification of devices within the computing network 102, thereby enabling the identification and downloading of a configuration file specific to a device. In some embodiments, each device in the computing network 102, and each device's unique identifier generated in block 1112 can be linked with its configuration file.

Symbolic Link Creation Algorithm

```
Leafs:
  1. Traverse to the leafs list,
  2. For the given leaf, check is this master.
  3. If master
    a) Obtain the uplink interfaces to the fabric switches
    b) For each uplink interfaces,
       - Obtain the link id from the interface by querying interface table
       - Obtain the peer interface from the link by querying the link database
       - Obtain the upstream switch name from interface table
    c) Create the symbolic link file with following syntax
       <src_host_name>.conf <======> <vendor>-<upstream_switch>-<peer interface
    name>.conf
```

-continued

```
4. If backup
   a) Obtain the master node name from device table.
   b) Repeat step 3 with src_host_name as master host name.
        Single configuration file for both master and backup of a virtual chassis.
Fabric Switches:
  1. For fabric switches, the peer switches are tr in the core rack and
  spine and leaf for the fabric racks
  2. Traverse to the fabric list,
  3. Obtain the list of interfaces of this fabric switch
     a) For each interfaces,
        - Obtain the link id from the interface by querying interface table
        - Obtain the peer interface from the link by querying the link database
        - Obtain the upstream switch name from interface table
        - If the upstream switch is tr router and the interface is tr_uplink interface
          o Create the symbolic link file with following syntax src_host_name>.conf
               <======> <vendor>-<upstream_switch>-<peer interface name>.conf
          o Ignore other interfaces.
          This is for fabric-1, fabric-2, fabric-3 and fabric-4 switches in the topology
               diagram.
        - If the upstream router is spine:
          o Create the symbolic link file with following syntax <src_host_name>.conf
               <======> <vendor>-<upstream_switch>-<peer interface name>.conf
Spine Switches:
  1. For spine switches, the parent is fabric switch.
  2. Traverse to the spine switch list,
  3. Obtain the list of interfaces of this spine switch
     a) For each interface, check peer interface peer is part of a device
        - Obtain the link id from the interface by querying interface table
        - Obtain the peer interface from the link by querying the link database
        - Obtain the upstream fabric switch name from interface table
        - Create the symbolic link file with following syntax
          <src_host_name>.conf <======> <vendor>-<upstream_switch>-<peer
          interface name>.conf
```

Example

In one exemplary embodiment, leaf-71 of a specific, exemplary topology is connected with fabric-9, fabric-10, fabric-11 and fabric-12 switches with peer interfaces et-0/0/70 and et-0/0/71. The automation system creates symbolic links as follows to the leaf-71 configuration with all possible IP fabric parent information as below.

```
[rmutnuru@chi1-c-ad1anoob-ndm-01 configs]$ ls -al *fabric* | grep leaf-71
lrwxrwxrwx. 1 root 128 Jul 31 2018 JUNOS-chi1-c10u1-fabric-10-et-
  0_0_70.conf ->/home/netconf/netconfdefinitions//ansible/environments/usdc2
  /chi1/c10u1/templates/chi1-c10u1-leaf-71.usdc2.oraclecloud.com.conf
lrwxrwxrwx. 1 root 128 Jul 31 2018 JUNOS-chi1-c10u1-fabric-10-et-
  0_0_71.conf -> /home/netconf/netconfdefinitions//ansible/environments/usdc2
  /chi1/c10u1/templates/chi1-c10u1-leaf-71.usdc2.oraclecloud.com.conf
lrwxrwxrwx. 1 root 128 Jul 31 2018 JUNOS-chi1-c10u1-fabric-11-et-
  0_0_70.conf -> /home/netconf/netconfdefinitions//ansible/environments/usdc2
  /chi1/c10u1/templates/chi1-c10u1-leaf-71.usdc2.oraclecloud.com.conf
lrwxrwxrwx. 1 root 128 Jul 31 2018 JUNOS-chi1-c10u1-fabric-11-et-
  0_0_71.conf -> /home/netconf/netconfdefinitions//ansible/environments/usdc2
  /chi1/c10u1/templates/chi1-c10u1-leaf-71.usdc2.oraclecloud.com.conf
lrwxrwxrwx. 1 root 128 Jul 31 2018 JUNOS-chi1-c10u1-fabric-12-et-
  0_0_70.conf -> /home/netconf/netconfdefinitions//ansible/environments/usdc2
  /chi1/c10u1/templates/chi1-c10u1-leaf-71.usdc2.oraclecloud.com.conf
lrwxrwxrwx. 1 root 128 Jul 31 2018 JUNOS-chi1-c10u1-fabric-12-et-
  0_0_71.conf -> /home/netconf/netconfdefinitions//ansible/environments/usdc2
  /chi1/c10u1/templates/chi1-c10u1-leaf-71.usdc2.oraclecloud.com.conf
lrwxrwxrwx. 1 root 128 Jul 31 2018 JUNOS-chi1-c10u1-fabric-9-et-
  0_0_70.conf -> /home/netconf/netconfdefinitions//ansible/environments/usdc2
  /chi1/c10u1/templates/chi1-c10u1-leaf-71.usdc2.oraclecloud.com.conf
lrwxrwxrwx. 1 root 128 Jul 31 2018 JUNOS-chi1-c10u1-fabric-9-et-
  0_0_71.conf -> /home/netconf/netconfdefinitions//ansible/environments/usdc2
  /chi1/c10u1/templates/chi1-c10u1-leaf-71.usdc2.oraclecloud.com.conf
```

Returning again to process 1100, at block 1116, information is received from the triggering device. In some embodiments, this information can be received by the NAS 118 and/or the DHCP server 120. In some embodiments, this information can be included with the signal from the triggering device in step 1102, and in some embodiments, this information can be separately provided. In some embodiments, when a switch is powered on, the switch can initiate the DHCP protocol to be assigned an IP address within the computing network 102. Specifically, once the triggering switch is powered, the switch can broadcast DHCPDISCOVER message on the computing network 102, which broadcast can include a request for a network address. DHCP server 120 can acknowledge this DHCPDISCOVER message via the sending of DHCPACK, and can allocate an address to the triggering device. In some embodiments, this address can be a temporary address and can be allocated from a range designated for allocation as temporary addresses. In some embodiments, this range can be high in the subnet. The address is allocated from DHCP IP range pool mentioned in the DHCP definitions file above. The DHCP server 120 can then provide the allocated address to the triggering device. In some embodiments, the providing of this address by the DHCP server 120 can launch the ZTP process as indicated in block 1104, thus in some embodiments, the launching of the ZTP process can include the allocating and providing of this temporary address.

At block 1118, files are identified and sent to the triggering device. These initial files can include one or more of: firmware image files; configuration files, also referred to herein as initial configuration files; and executable files, which executable files are also referred to herein as first scripts. In some embodiments, these files can be identified and set to the triggering device by server 116, and specifically by one or more of NAS 118, DHCP server 120, and download server 122.

In some embodiments, identifying and sending of files can include the identifying and sending of a firmware image file to the triggering device. This firmware image file can be delivered to upgrade the firmware image of the triggering device. In some embodiments, the firmware image can be provided to the triggering device according to an operation of the DHCP server 120, and specifically via option 43 of the DHCP server 120. In such an embodiment, the DHCP server 120 can be used to provide configuration details about the location of the device software image and the software configuration file. In some embodiments, the DHCP server 120 can further provide the networking configuration for the switches after power-on boot of the triggering device.

In some embodiments, the triggering device participates in a firmware image upgrade process by using DHCP server 120 option 43, sub option 00. After switch upgrades to the new image, it will try to download the configuration from DHCP server by broadcasting DHCP REQUEST message with option 43, sub option 01. In the manner, the DHCP server 120 can update the device with its info like vendor name and model. The DHCP server 120 can further identify the initial configuration file to be downloaded on the switch based on vendor/model. In some embodiments, the initial configuration file contains an event policy that, when executed by the triggering device, causes the triggering device to identify and download one or several relevant scripts. When received by the triggering device, this event policy causes the triggering device to gather information relating to coupled devices and to download executable scripts, referred to herein as stage2 scripts.

In some embodiments, this initial configuration file enables and/or directs the triggering device to exchange communications with coupled devices, and specifically with directly coupled devices in the computing network 102. This exchange of communications collects information identifying other devices in the computing network 102 to which the triggering device is coupled, and in some embodiments to which the triggering device is directly coupled. These communications can be exchanged via LLDP.

An exemplary algorithm for these DHCP server 120 operations is shown below:

| DHCP/BOOTP |
|---|
| a. DHCP option 150 or 66 to specify the IP address of the FTP, HTTP, or TFTP server.<br>Note: You must configure either option 150 or option 66. If you configure both option 150 and option 66, option 150 takes precedence, and option 66 is ignored. Also, make sure you specify an IP address, not a hostname, because name resolution is not supported.<br>b. DHCP option 43. This is an opaque option that vendor can use for whatever private information they need to communicate. We plan to use this option in following way.<br>1. DHCP option 43, sub option 00: (name of the software image file on the FTP/HTTP/TFTP server). If this option is configured, the switch compares the version of the provided software image to the version of the software installed on the switch and configured to boot.<br>• If the device OS versions are different, the switch downloads the software image from the FTP, HTTP, or TFTP server and installs the device OS.<br>• If the software versions are the same, the switch does not upgrade the software.<br>Note: When the DHCP server cannot use sub option 00, configure the image file using sub option 04. If both sub option 00 and sub option 04 are defined, sub option 04 is ignored.<br>2. DHCP option 43, sub option 01: (name of the configuration file on the FTP/HTTP/TFTP server).<br>• If both DHCP option 43 sub option 01 and sub option 00/02/04 are specified, sub option 01 is processed after sub option 00/02/04. The device firmware is upgraded, and then the configuration file is applied.<br>• If this option is not specified, device will boot with default configuration.<br>3. DHCP option 43, sub option 02: (symbolic link to the software image file on the FTP/HTTP/TFTP server)<br>• If the device firmware versions are different, the switch downloads the software image from the FTP, HTTP, or TFTP server and installs the new firmware.<br>• If the software versions are the same, the switch does not upgrade the software.<br>4. DHCP option 43, sub option 03: (the file transfer mode setting. E.g. FTP/HTTP/TFTP).<br>• If this option is configured, the switch accesses the FTP, HTTP, or TFTP server using the specified transfer mode setting—for example, FTP.<br>• If this option is not configured, TFTP becomes the transfer mode automatically.<br>5. DHCP option 43, sub option 04: (name of the software image file on the FTP/HTTP/TFTP server)<br>• If the device OS versions are different, the switch downloads the software image from the FTP, HTTP, or TFTP server and installs the firmware image.<br>• If the software versions are the same, the switch does not upgrade the software.<br>Note: When the DHCP server cannot use sub option 00, configure the image file using sub option 04. If both sub option 00 and sub option 04 are defined, sub option 04 is ignored. |

-continued

| DHCP/BOOTP |
| --- |
| c. (Optional) If DHCP option 7 is specified, you can configure one or more syslog servers. |
| d. (Optional) If DHCP option 42 is specified, you can configure one or more NTP servers. |
| 2. TFTP |
| TFTP server may be used to host the image and configuration files. In some embodiments, this can be default. In some embodiments, customers can choose FTP or HTTP in place of TFTP to specify the transfer protocol as mentioned below. |
| 3. FTP |
| In some embodiments, the FTP server may be used to host the image and configuration files. |
| 4. HTTP |
| In some embodiments, the HTTP server may be used to host the image and configuration files. |

At block 1120, the triggering device executes the received files, which received files can include first scripts including an executable event policy. In some embodiments, the execution of the received files can result include installing any updated firmware image and gathering information identifying devices in the computing network 102 coupled to the triggering device. Based on this information, the triggering device can identify other devices in the computing network 102 to which the triggering device is coupled and/or identify links coupling the triggering device to other devices in the computing network 102.

In some embodiments, this information identifying devices coupled to the triggering device can be gathered via the exchange of communications between the triggering device and other devices in the computing network 102. In some embodiments, these communications can be exchanged via LLDP, and in some embodiments these other devices in the computing network can be devices coupled to the triggering device, and in some embodiments, these other devices can be directly coupled to the triggering device. These devices directly coupled to the triggering device can, in some embodiments, be horizontal neighboring devices, or in other words, can be located in the same tier of the computing network 102 as the triggering device.

In some embodiments, and as indicated in block 1122, the triggering device generates a unique identifier based on information collected in block 1120. In some embodiments, this information is collected and/or generated via the exchange of communications with other devices in the computing network 102. In some embodiments, this unique identifier can be generated based LLDP neighbors and peer interface names.

As indicated in block 1124, this unique identifier is compared with unique device identifiers generated in block 1112 and associated with configuration files in block 1114. This comparing can be performed, in some embodiments, by the triggering device, and in some embodiments, by the server 116, and specifically the storage 124 and/or the download server 122. The triggering device can send a request for the downloading of the configuration file linked and/or associated with the unique device identifier generated in block 1112 that matches with the unique identifier generated in block 1122. This request, which can include the unique identifier generated in block 1122, can be received by the server 116, and specifically by the download server 122. The server can download the configuration file linked and/or associated with the unique device identifier generated in block 1112 that matches with the unique identifier generated in block 1122 to the triggering device. Thus, the triggering device downloads the configuration file linked and/or associated with the unique device identifier generated in block 1112 that matches with the unique identifier generated in block 1122. If the triggering device is part of a virtual chassis, the triggering device and other device(s) in the virtual chassis can download the same configuration file, which can be the same master copy. Once the configuration file has been downloaded, the triggering device, and in the case of a virtual chassis, any other devices in the virtual chassis, can be configured according to the configuration file.

Figure 13:
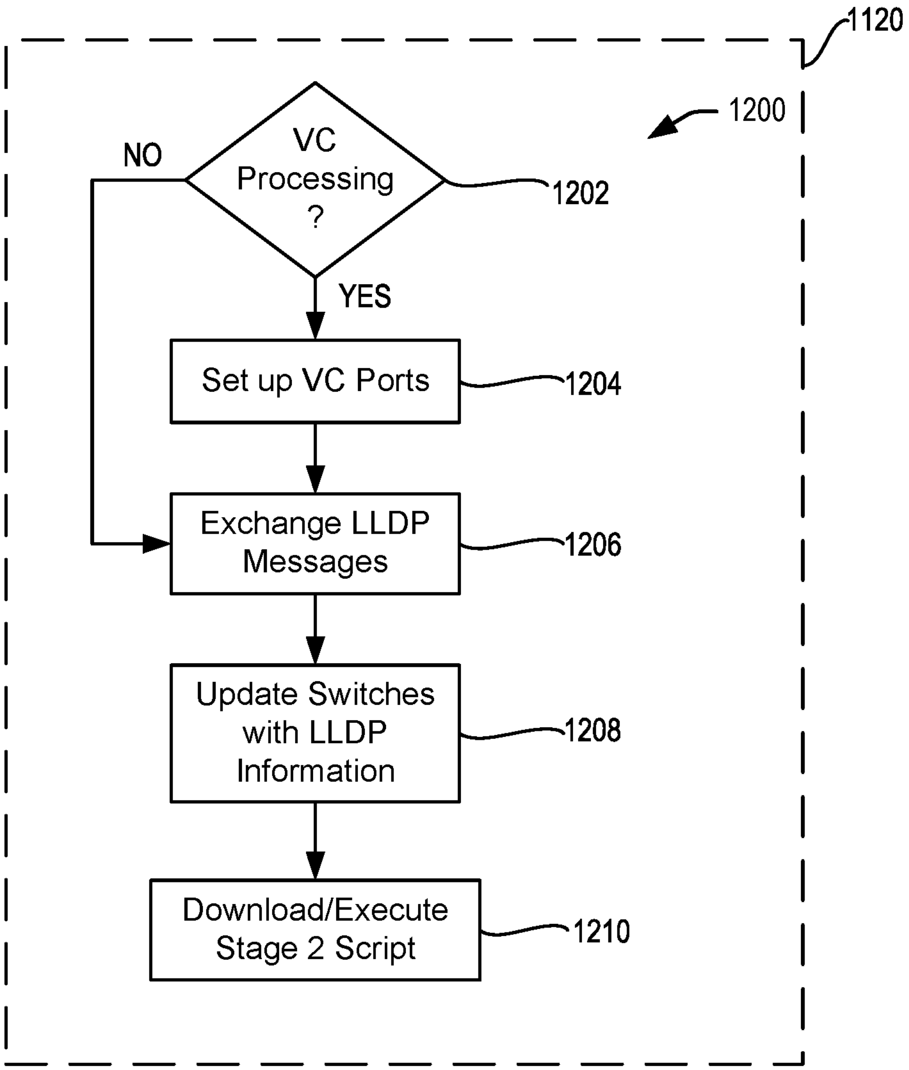
FIG. 13 is a flowchart illustrating one embodiment of a process for Zero Touch Provisioning.

With reference now to FIG. 13, a flowchart illustrating one embodiment of a process 1200 for executing a received file is shown. In some embodiments, the process 1200 can be performed as a part of, or in the place of step 1120 of FIG. 12. The process 1200 begins at decision step 1202, wherein it is determined if the triggering device is in a virtual chassis with at least one other device in the computing network 102. This decision step can, in some embodiments, be performed by the execution of the first script. In some embodiments, this can include determining if, for the triggering device, virtual chassis processing takes place. In some embodiments, this can include attempting to download a virtual chassis script associated with the triggering device. In some embodiments, a virtual chassis script is associated with a device when the device is in a virtual chassis, and thus the presence of the virtual chassis script can determine whether the triggering device is in a virtual chassis and is subject to virtual chassis processing. In some embodiments, virtual chassis processing is only potentially relevant to leaf devices.

If it is determined that the triggering device is subject to virtual chassis processing, then the process 1200 proceeds to block 1204, wherein virtual chassis ports are set up. In some embodiments, these virtual chassis points can be set up along with member identifiers. In some embodiments, an even numbered device such as an even numbered leaf switch is marked as master (member 0) and the immediate odd number is configured line card (member 1).

After the virtual chassis ports have been set up, or returning to decision step 1202, if it is determined that the triggering device is not subject to virtual chassis processing, the process 1200 proceeds to step 1206, wherein LLDP messages are exchanged. In some embodiments, these messages are exchanged between the adjacent switches. In some embodiments, all switches are updated with their LLDP neighbor as indicated in block 1208.

At block 1210, a stage2 script, also referred to herein as a second script is downloaded and executed. The second script can be downloaded by the triggering device from, in some embodiments, the server 116, and specifically from the download server 120 and/or the storage 124. In some embodiments, this second script can, in some embodiments, check for LLDP neighbors, and, in some embodiments, can generate the configuration name based on LLDP neighbors and peer interfaces.

Figure 14:
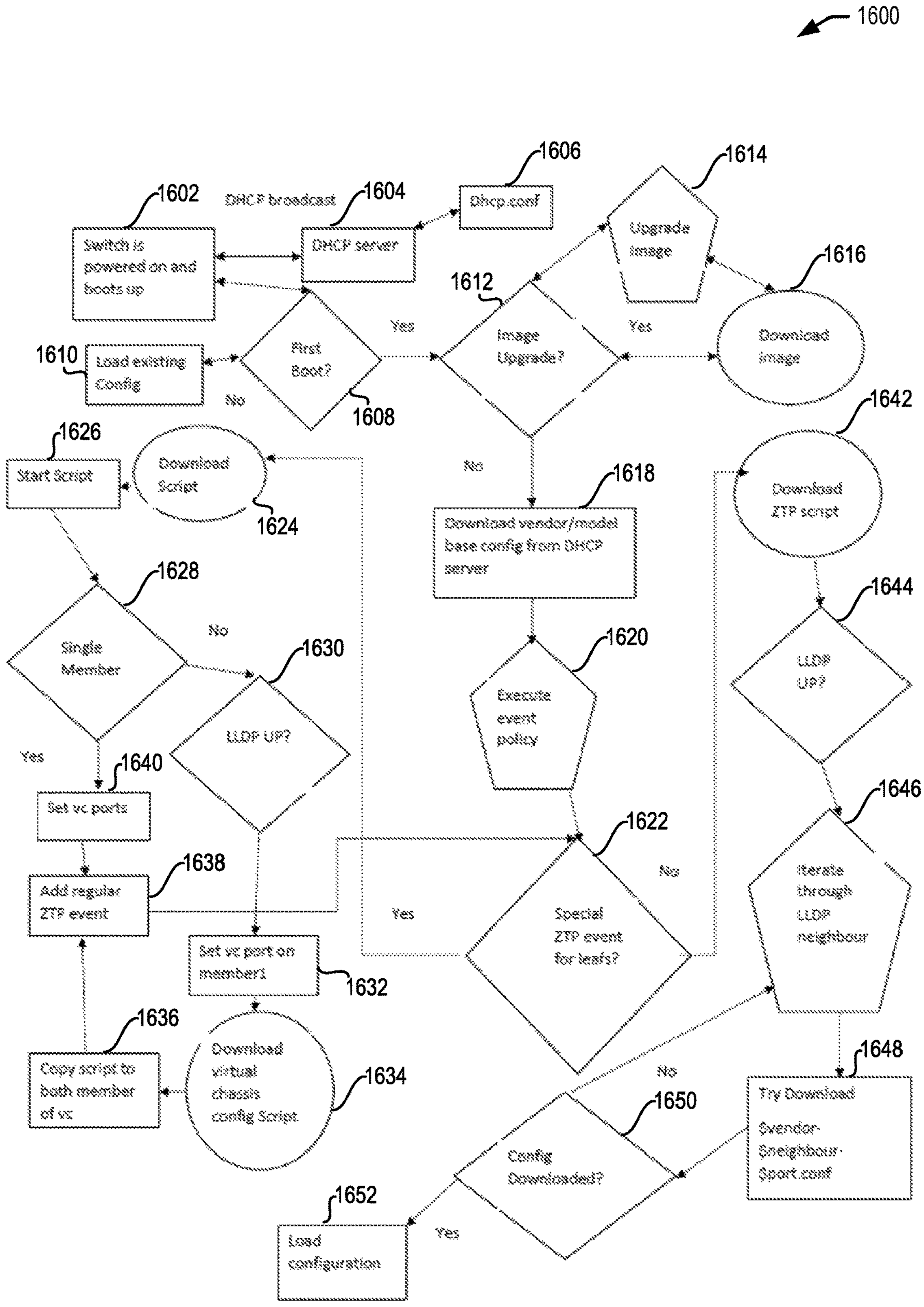
FIG. 14 a flowchart illustrating one embodiment of the ZTP process.
Figure 15:
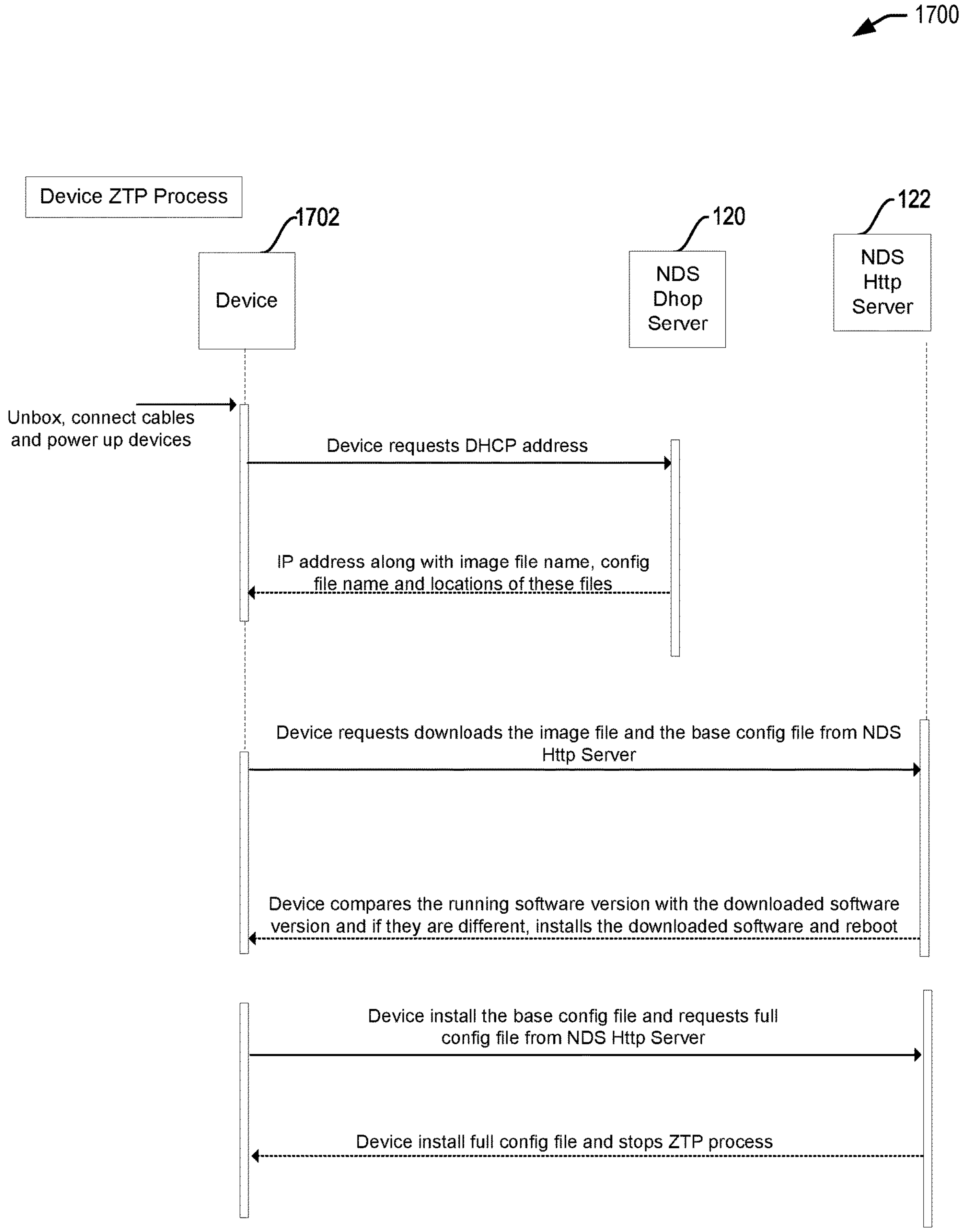
FIG. 15 is a diagram illustrating communications between components as part of his ZTP process.

With reference now to FIGS. 14 and 15, exemplary embodiments of the implementation of ZTP is shown. Specifically, FIG. 14 is a flowchart illustrating one embodiment of the ZTP process 1600. The process can be performed by the server 116. The process 1600 begins at block 1602 wherein a switch is powered on and boots up. The switch communicates with the DHCP server 120 according to DHCP protocol as indicated in block 1604. The DHCP server 120 can interact with the switch according to the DHCP.conf file as indicated in block 1606, which DHCP.conf file can direct the generation of a temporary IP address. A decision state 1608, it is determined if the powering on and booting of the switch is the first time that that switches is booted. If it is not the first time that that switch has been booted, then at block 1610, the existing configuration file for that switch is loaded. Alternatively, if it is the first time the switch has been booted, then the process 1600 proceeds decision state 1612, wherein it is determined whether to upgrade the device image of the switch. If it is determined to upgrade the device image of the switch, then the process 1600 proceeds to step 1614 when the device images upgraded, which can include the downloading of the device image to the switch as indicated in block 1616.

Returning again to decision step 1612, if it is determined that the device image does not need to be upgraded, or after the device image has been upgraded, the process 1600 proceeds to block 1618 wherein an initial configuration file is downloaded to the switch. In some embodiments, this initial configuration file can be downloaded to the switch from the server 116, and specifically from the DHCP server 120 and/or the download server 122. The process 1600 and proceeds to step 1620 where the event policy included in the download initial configuration file is executed. A decision step 1622, it is determined if the event policy includes special event policies for leaf devices. In some embodiments, this can include determining if the switch is a leaf device, and if the switch is in a virtual chassis.

If the switch is in a virtual chassis, and thus a special event is identified, then the process 1600 proceeds to 1624 wherein a script is downloaded. In some embodiments, this script can be a second script which can be downloaded from the server 116 and specifically from the DHCP server 120 and/or the download server 122. At block 1626, the script is started and/or executed, and at decision step 1628, it is determined if the switch is a single member within the virtual chassis. If the switch is not a single member within the virtual chassis, than the process 1600 proceeds to decision step 1630 wherein it is determined if LLDP has been enabled and/or is active. If LLDP has not been enabled and/or is inactive, then LLDP is enabled and/or is activated.

The process 1600 then proceeds to block 1632 wherein virtual chassis ports are set, and specifically are set on a first member in the virtual chassis. At block 1634, the configuration file for the devices in the virtual chassis is downloaded. This configuration file can be downloaded from the server 116 and specifically from the DHCP server 120 and/or the download server 122. At block in 1636 is dominant configuration file its copied to all of the members within the virtual chassis, and then at block 1638 a regular ZTP event is added. Returning again to decision step 1628, it if it is determined that the switch is a single member within the virtual chassis, then the process 1600 proceeds to block 1640 wherein virtual chassis ports are set, and then to block 1638 wherein a regular ZTP event is added.

Returning again to decision step 1622, if it is determined that there are no ZTP special events, than the process 1600 proceeds to step 1642 wherein a script is downloaded. In some embodiments, this can be the second script that can be downloaded from the server 116 and specifically from the DHCP server 120 and/or the download server 122. The downloaded script can be executed, and the process 1600 can proceed to decision step 1644 wherein it is determined if LLDP has been enabled and/or is active. If LLDP has not been enabled and/or is inactive, then LLDP is enabled and/or is activated.

The process 1600 and proceeds to step 1646 wherein LLDP communications are exchanged with neighbors of the switch. In some embodiments, this can include iterating through neighbors to exchange communications with those neighbors. Based on information gathered through the exchange of communications with the switch's neighbors, the process 1600 proceeds to block 1648 and attempts to download a configuration file based on information gathered through this exchange of communications with the switch's neighbors. In some embodiments, this attempt to download can include the switch generating a unique name based on information gathered through the exchange of communications with the switch's neighbors.

At decision step 1650, it can be determined if the configuration file was downloaded. If the configuration file was not downloaded, than the process 1600 can return to step 1646 and the exchange of communications with the switch's neighbors can be repeated. If it is determined that the configuration file was successfully downloaded, and the process 1600 proceeds to block 1652, wherein the configuration file is loaded.

With reference now to FIG. 15, a diagram illustrating communications between components as part of his ZTP process is shown. This diagram illustrates communications between the device/switch 1702, the DHCP server 120, and the download server 122. As shown, the device 1702 is unboxed, communicatingly connected to other devices in the network of devices 104 via, for example, one or several cables, and powered up and booted. The device 1702 then requests a DHCP address from the DHCP server 120, and, in response to this request, the DHCP server 120 provides an IP address along with an image file name, a configuration file name, and information identifying the location of the image file in the configuration file.

The device 1702 downloads the image file and the initial configuration file from the download server 122. The device 1702 then compares the running software version with the download software version of the image file and the initial configuration file, and if one or both are different, the device 1702 installs the downloaded software and then reboots. The device 1702 installs the base configuration file and request the full configuration file from the download server 122. In some embodiments, this can include the executing of the downloaded event policy and one or several downloaded scripts, the exchanging of communications with device neighbors, and the generating of the unique name based on information gathered from this exchange of communications. In some embodiments, the full configuration file is requested based on the information gathered via the exchange communications with device neighbors and/or the unique name generated by the device 1702 based on information gathered from this exchange of communication with neighbors. The device 1702 then installs the full configuration file and, in some embodiments, the ZTP process then terminates.

Example Implementation

Figure 16:
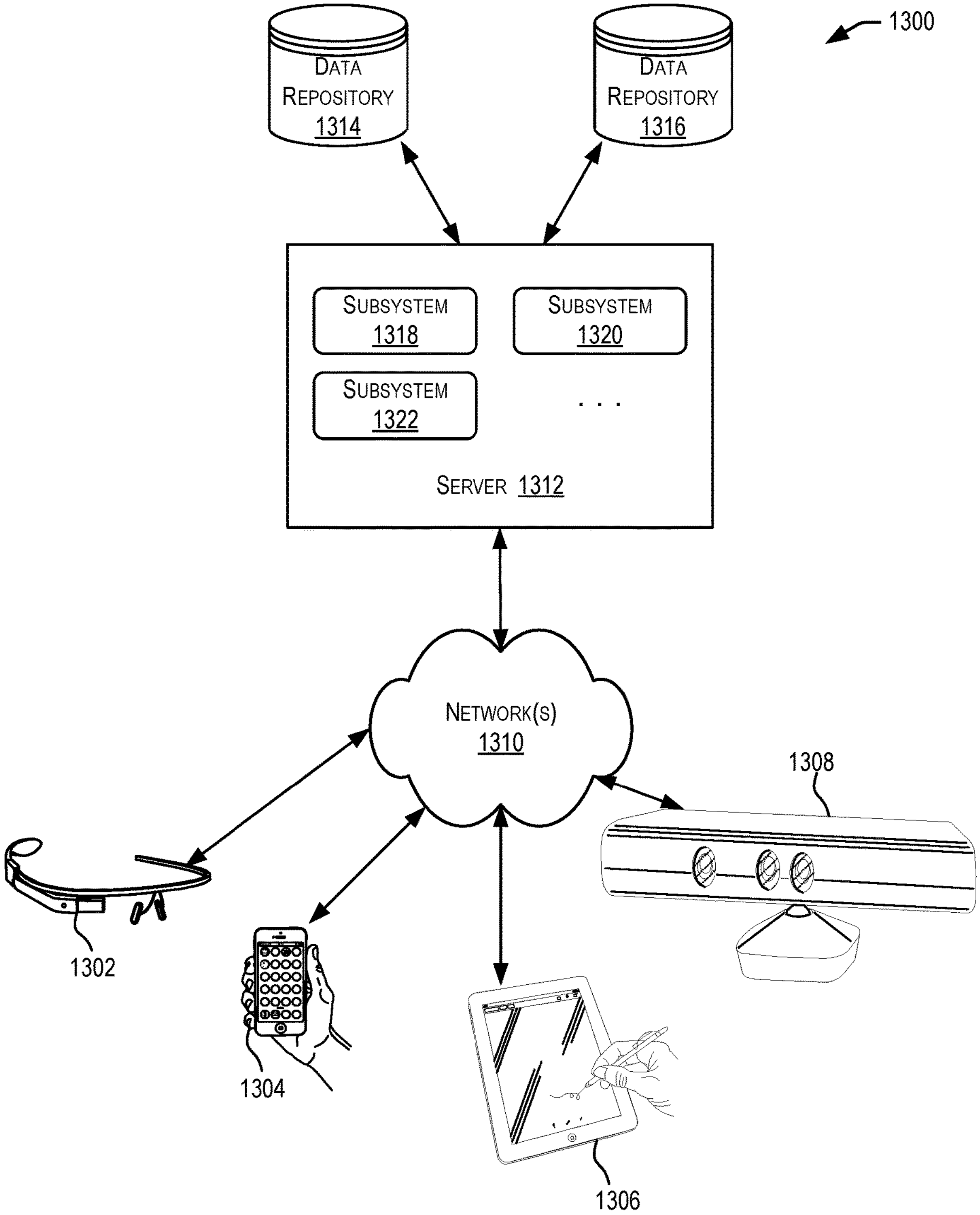
FIG. 16 depicts a simplified diagram of a distributed system for implementing an embodiment.

FIG. 16 depicts a simplified diagram of a distributed system 1300 for implementing an embodiment. In the illustrated embodiment, distributed system 1300 includes one or more client computing devices 1302, 1304, 1306, and 1308, coupled to a server 1312 via one or more communication networks 1310. Clients computing devices 1302, 1304, 1306, and 1308 may be configured to execute one or more applications.

In various embodiments, server 1312 may be adapted to run one or more services or software applications that enable the processing described in this disclosure.

In certain embodiments, server 1312 may also provide other services or software applications that can include non-virtual and virtual environments. In some embodiments, these services may be offered as web-based or cloud services, such as under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in FIG. 16, server 1312 may include one or more components 1318, 1320 and 1322 that implement the functions performed by server 1312. These components may include software components that may be executed by one or more processors, hardware components, or combinations thereof. It should be appreciated that various different system configurations are possible, which may be different from distributed system 1300. The embodiment shown in FIG. 16 is thus one example of a distributed system for implementing an embodiment system and is not intended to be limiting.

Users may use client computing devices 1302, 1304, 1306, and/or 1308 to interact with server 1312 in accordance with the teachings of this disclosure. A client device may provide an interface that enables a user of the client device to interact with the client device. The client device may also output information to the user via this interface. Although FIG. 13 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1310 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1310 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1312 can include one or more virtual machines running virtual operating systems, or other computing architectures involving virtualization such as one or more flexible pools of logical storage devices that can be virtualized to maintain virtual storage devices for the server. In various embodiments, server 1312 may be adapted to run one or more services or software applications that provide the functionality described in the foregoing disclosure.

The computing systems in server 1312 may run one or more operating systems including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more data repositories 1314, 1316. These data repositories may be used to store data and other information in certain embodiments. For example, one or more of the data repositories 1314, 1316 may be used to store data or information generated by the processing described herein and/or data or information used for the processing described herein. Data repositories 1314, 1316 may reside in a variety of locations. For example, a data repository used by server 1312 may be local to server 1312 or may be remote from server 1312 and in communication with server 1312 via a network-based or dedicated connection. Data repositories 1314, 1316 may be of different types. In certain embodiments, a data repository used by server 1312 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1314, 1316 may also be used by applications to store application data. The data repositories used by applications may be of different types such as, for example, a key-value store repository, an object store repository, or a general storage repository supported by a file system.

Figure 17:
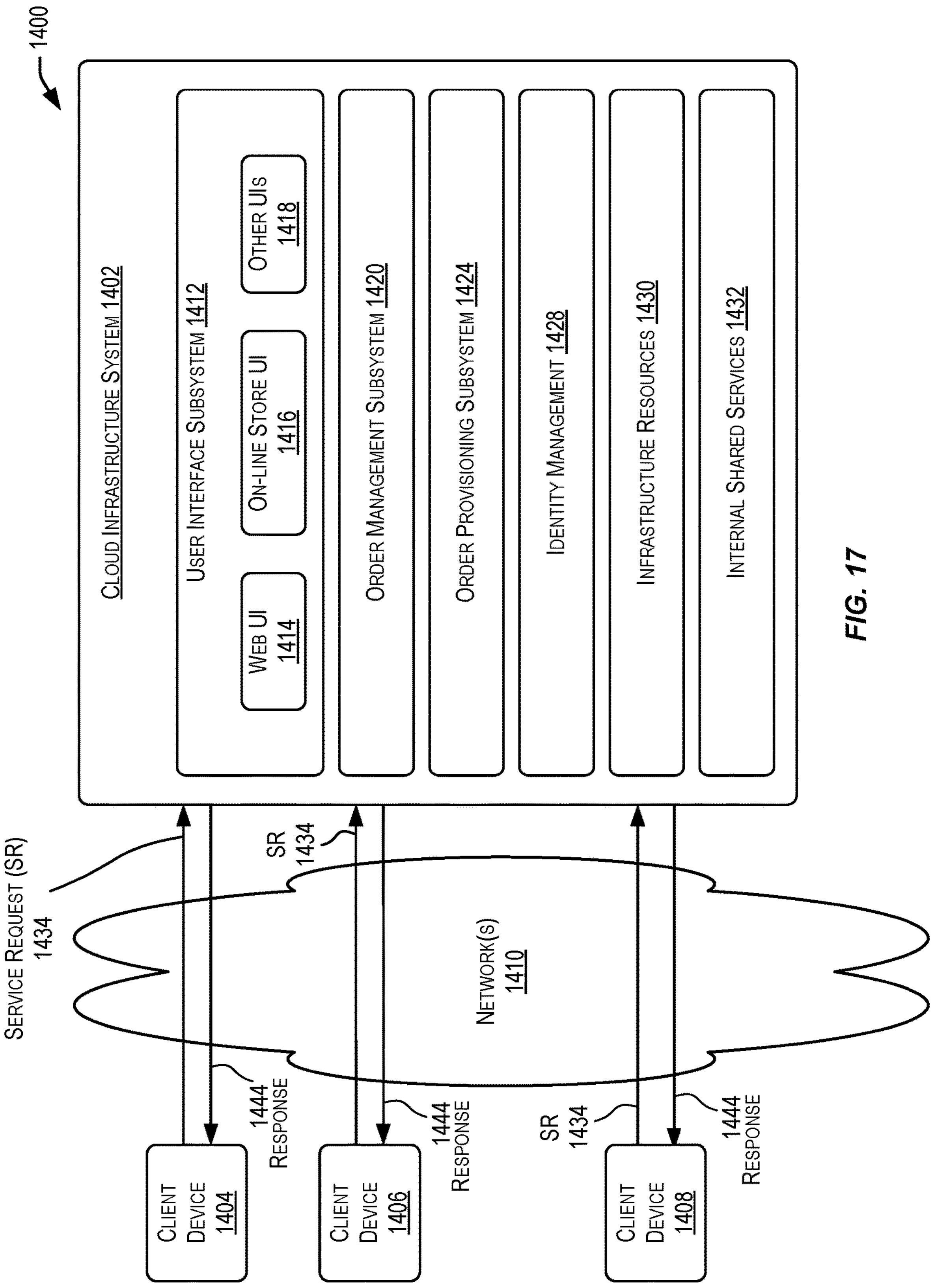
FIG. 17 is a simplified block diagram of a cloud-based system environment offering cloud services, in accordance with certain embodiments.

In certain embodiments, the functionalities described in this disclosure may be offered as services via a cloud environment. FIG. 17 is a simplified block diagram of a cloud-based system environment in which functionalities described herein may be offered as cloud services, in accordance with certain embodiments. In the embodiment depicted in FIG. 17, cloud infrastructure system 1402 may provide one or more cloud services that may be requested by users using one or more client computing devices 1404, 1406, and 1408. Cloud infrastructure system 1402 may comprise one or more computers and/or servers that may include those described above for server 1312. The computers in cloud infrastructure system 1402 may be organized as general purpose computers, specialized server computers, server farms, server clusters, or any other appropriate arrangement and/or combination.

Network(s) 1410 may facilitate communication and exchange of data between clients 1404, 1406, and 1408 and cloud infrastructure system 1402. Network(s) 1410 may include one or more networks. The networks may be of the same or different types. Network(s) 1410 may support one or more communication protocols, including wired and/or wireless protocols, for facilitating the communications.

The embodiment depicted in FIG. 17 is only one example of a cloud infrastructure system and is not intended to be limiting. It should be appreciated that, in some other embodiments, cloud infrastructure system 1402 may have more or fewer components than those depicted in FIG. 17, may combine two or more components, or may have a different configuration or arrangement of components. For example, although FIG. 17 depicts three client computing devices, any number of client computing devices may be supported in alternative embodiments.

The term cloud service is generally used to refer to a service that is made available to users on demand and via a communication network such as the Internet by systems (e.g., cloud infrastructure system 1402) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1402 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1402 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1402. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1402. Cloud infrastructure system 1402 then performs processing to provide the services requested in the customer's subscription order. Cloud infrastructure system 1402 may be configured to provide one or even multiple cloud services.

Cloud infrastructure system 1402 may provide the cloud services via different deployment models. In a public cloud model, cloud infrastructure system 1402 may be owned by a third party cloud services provider and the cloud services are offered to any general public customer, where the customer can be an individual or an enterprise. In certain other embodiments, under a private cloud model, cloud infrastructure system 1402 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1402 and the services provided may be shared by several organizations in a related community. Various other models such as hybrids of the above mentioned models may also be used.

Client computing devices 1404, 1406, and 1408 may be of different types (such as devices 1302, 1304, 1306, and 1308 depicted in FIG. 16) and may be capable of operating one or more client applications. A user may use a client device to interact with cloud infrastructure system 1402, such as to request a service provided by cloud infrastructure system 1402.

In some embodiments, the processing performed by cloud infrastructure system 1402 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 17, cloud infrastructure system 1402 may include infrastructure resources 1430 that are utilized for facilitating the provision of various cloud services offered by cloud infrastructure system 1402. Infrastructure resources 1430 may include, for example, processing resources, storage or memory resources, networking resources, and the like.

In certain embodiments, to facilitate efficient provisioning of these resources for supporting the various cloud services provided by cloud infrastructure system 1402 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1402 may itself internally use services 1432 that are shared by different components of cloud infrastructure system 1402 and which facilitate the provisioning of services by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1402 may comprise multiple subsystems. These subsystems may be implemented in software, or hardware, or combinations thereof. As depicted in FIG. 17, the subsystems may include a user interface subsystem 1412 that enables users or customers of cloud infrastructure system 1402 to interact with cloud infrastructure system 1402. User interface subsystem 1412 may include various different interfaces such as a web interface 1414, an online store interface 1416 where cloud services provided by cloud infrastructure system 1402 are advertised and are purchasable by a consumer, and other interfaces 1418. For example, a customer may, using a client device, request (service request 1434) one or more services provided by cloud infrastructure system 1402 using one or more of interfaces 1414, 1416, and 1418. For example, a customer may access the online store, browse cloud services offered by cloud infrastructure system 1402, and place a subscription order for one or more services offered by cloud infrastructure system 1402 that the customer wishes to subscribe to. The service request may include information identifying the customer and one or more services that the customer desires to subscribe to.

In certain embodiments, such as the embodiment depicted in FIG. 17, cloud infrastructure system 1402 may comprise an order management subsystem (OMS) 1420 that is configured to process the new order. As part of this processing, OMS 1420 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1420 may then invoke the order provisioning subsystem (OPS) 1424 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1424 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1402 may send a response or notification 1444 to the requesting customer to indicate when the requested service is now ready for use. In some instances, information (e.g., a link) may be sent to the customer that enables the customer to start using and availing the benefits of the requested services.

Cloud infrastructure system 1402 may provide services to multiple customers. For each customer, cloud infrastructure system 1402 is responsible for managing information related to one or more subscription orders received from the customer, maintaining customer data related to the orders, and providing the requested services to the customer. Cloud infrastructure system 1402 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1402 may provide services to multiple customers in parallel. Cloud infrastructure system 1402 may store information for these customers, including possibly proprietary information. In certain embodiments, cloud infrastructure system 1402 comprises an identity management subsystem (IMS) 1428 that is configured to manage customers information and provide the separation of the managed information such that information related to one customer is not accessible by another customer. IMS 1428 may be configured to provide various security-related services such as identity services, such as information access management, authentication and authorization services, services for managing customer identities and roles and related capabilities, and the like.

Figure 18:
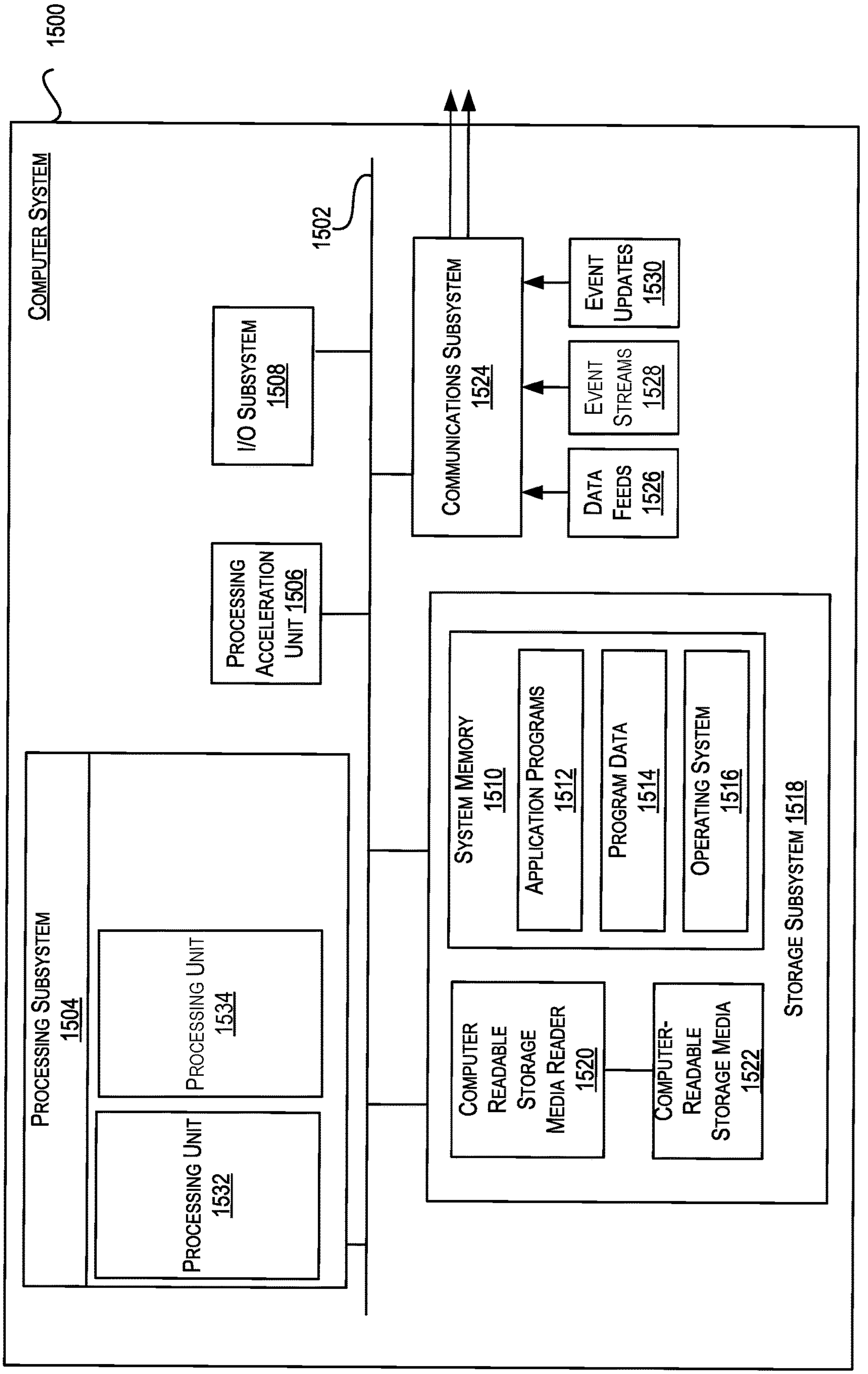
FIG. 18 illustrates an exemplary computer system that may be used to implement certain embodiments.

FIG. 18 illustrates an exemplary computer system 1500 that may be used to implement certain embodiments. For example, in some embodiments, computer system 1500 may be used to implement any of the system and subsystems for performing processing according to the present disclosure. As shown in FIG. 18, computer system 1500 includes various subsystems including a processing subsystem 1504 that communicates with a number of other subsystems via a bus subsystem 1502. These other subsystems may include a processing acceleration unit 1506, an I/O subsystem 1508, a storage subsystem 1518, and a communications subsystem 1524. Storage subsystem 1518 may include non-transitory computer-readable storage media including storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1504 controls the operation of computer system 1500 and may comprise one or more processors, application specific integrated circuits (ASICs), or field programmable gate arrays (FPGAs). The processors may include be single core or multicore processors. The processing resources of computer system 1500 can be organized into one or more processing units 1532, 1534, etc. A processing unit may include one or more processors, one or more cores from the same or different processors, a combination of cores and processors, or other combinations of cores and processors. In some embodiments, processing subsystem 1504 can include one or more special purpose co-processors such as graphics processors, digital signal processors (DSPs), or the like. In some embodiments, some or all of the processing units of processing subsystem 1504 can be implemented using customized circuits, such as application specific integrated circuits (ASICs), or field programmable gate arrays (FPGAs).

In some embodiments, the processing units in processing subsystem 1504 can execute instructions stored in system memory 1510 or on computer readable storage media 1522. In various embodiments, the processing units can execute a variety of programs or code instructions and can maintain multiple concurrently executing programs or processes. At any given time, some or all of the program code to be executed can be resident in system memory 1510 and/or on computer-readable storage media 1522 including potentially on one or more storage devices. Through suitable programming, processing subsystem 1504 can provide various functionalities described above. In instances where computer system 1500 is executing one or more virtual machines, one or more processing units may be allocated to each virtual machine.

In certain embodiments, a processing acceleration unit 1506 may optionally be provided for performing customized processing or for off-loading some of the processing performed by processing subsystem 1504 so as to accelerate the overall processing performed by computer system 1500.

I/O subsystem 1508 may include devices and mechanisms for inputting information to computer system 1500 and/or for outputting information from or via computer system 1500. In general, use of the term input device is intended to include all possible types of devices and mechanisms for inputting information to computer system 1500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1500 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1518 provides a repository or data store for storing information and data that is used by computer system 1500. Storage subsystem 1518 provides a tangible non-transitory computer-readable storage medium for storing the basic programming and data constructs that provide the functionality of some embodiments. Storage subsystem 1518 may store software (e.g., programs, code modules, instructions) that when executed by processing subsystem 1504 provides the functionality described above. The software may be executed by one or more processing units of processing subsystem 1504. Storage subsystem 1518 may also provide a repository for storing data used in accordance with the teachings of this disclosure.

Storage subsystem 1518 may include one or more non-transitory memory devices, including volatile and non-volatile memory devices. As shown in FIG. 18, storage subsystem 1518 includes a system memory 1510 and a computer-readable storage media 1522. System memory 1510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by processing subsystem 1504. In some implementations, system memory 1510 may include multiple different types of memory, such as static random access memory (SRAM), dynamic random access memory (DRAM), and the like.

By way of example, and not limitation, as depicted in FIG. 18, system memory 1510 may load application programs 1512 that are being executed, which may include various applications such as Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1522 may store programming and data constructs that provide the functionality of some embodiments. Computer-readable media 1522 may provide storage of computer-readable instructions, data structures, program modules, and other data for computer system 1500. Software (programs, code modules, instructions) that, when executed by processing subsystem 1504 provides the functionality described above, may be stored in storage subsystem 1518. By way of example, computer-readable storage media 1522 may include non-volatile memory such as a hard disk drive, a magnetic disk drive, an optical disk drive such as a CD ROM, DVD, a Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1518 may also include a computer-readable storage media reader 1520 that can further be connected to computer-readable storage media 1522. Reader 1520 may receive and be configured to read data from a memory device such as a disk, a flash drive, etc.

In certain embodiments, computer system 1500 may support virtualization technologies, including but not limited to virtualization of processing and memory resources. For example, computer system 1500 may provide support for executing one or more virtual machines. In certain embodiments, computer system 1500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1500. Accordingly, multiple operating systems may potentially be run concurrently by computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to establish a communication channel to one or more client devices via the Internet for receiving and sending information from and to the client devices.

Communication subsystem 1524 may support both wired and/or wireless communication protocols. For example, in certain embodiments, communications subsystem 1524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

Communication subsystem 1524 can receive and transmit data in various forms. For example, in some embodiments, in addition to other forms, communications subsystem 1524 may receive input communications in the form of structured and/or unstructured data feeds 1526, event streams 1528, event updates 1530, and the like. For example, communications subsystem 1524 may be configured to receive (or send) data feeds 1526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1524 may be configured to receive data in the form of continuous data streams, which may include event streams 1528 of real-time events and/or event updates 1530, that may be continuous or unbounded in nature with no explicit end.

Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to communicate data from computer system 1500 to other computer systems or networks. The data may be communicated in various different forms such as structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1500 depicted in FIG. 18 is intended only as a specific example. Many other configurations having more or fewer components than the system depicted in FIG. 18 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:

accessing by a network deployment system model information for a computing network comprising a plurality of layers of linked devices, the model information specifying a network topology for the computing network, a plurality of components of the computing network, and information identifying hierarchical relationships between one or more components from the plurality of components; and setting up the computing network by the network deployment system based upon the model information, wherein setting up the computing network comprises:

creating a topology database, wherein creating the topology database comprises:

creating switches at each layer in the computing network;

mapping links connecting the switches, wherein each link connects a pair of switches;

creating Border Gateway Protocol ("BGP") routing for both an underlay network and an overlay network;

creating a topology graph of the computing network, wherein the topology graph comprises a plurality of nodes, each of the plurality of nodes representing one of the devices in the computing network, and wherein the nodes are connected by edges, each of the edges representing one link;

generating Zero Touch Provisioning ("ZTP") links; and building the computing network based on the topology database.

2. The method of claim 1, wherein creating switches at each layer in the computing network comprises: determining a hierarchy of devices in the computing network, the hierarchy defining a plurality of tiers of the computing network and identifying devices within each tier of the computing network; computing a number of switches in each tier of the computing network; and adding a representation of each of at least some of the identified devices to a device database.

3. The method of claim 2, wherein adding a representation of each of the at least some of the identified devices to the device database comprises: adding switch attributes; and adding a physical interface list.

4. The method of claim 3, wherein the representation of each of at least some of the identified devices comprises a Domain Name Server ("DNS") name.

5. The method of claim 2, wherein mapping links connecting the switches comprises: identifying links from each of the tiers in the computing network; assigning a link identifier to each of the identified links; and storing the link identifiers in a link table.

6. The method of claim 2, wherein identifying links from each of the tiers in the computing network comprises identifying peer links between leaf devices.

7. The method of claim 1, wherein creating the topology database further comprises allocating an internet protocol ("IP") address for each device in the computing network.

8. The method of claim 7, wherein creating the topology graph comprises: placing nodes associated with transit routers at a top of the topology graph, and organizing the nodes according to hierarchy and links.

9. The method of claim 7, wherein creating the topology graph comprises ingesting the nodes and edges into a visualization tool; and storing an output of the visualization tool as the topology graph in the topology database.

10. The method of claim 1, wherein creating the topology database further comprises processing any virtual chassis configuration associated with devices in the computing network.

11. The method of claim 1, wherein creating the topology database further comprises creating a cable map and a DNS map.

12. The method of claim 1, wherein creating the topology database further comprises associating communications features with leaf devices in the computing network.

13. The method of claim 12, wherein the communications features comprise at least one of: a virtual local area network ("VLAN"); virtual routing and forwarding ("VRF"); a VLAN interface; and a VLAN port.

14. The method of claim 1, wherein generating ZTP links comprises, for each device in the computing network, receiving a configuration file corresponding to a unique name for the device, wherein the unique name is generated at least in part based on directly linked devices.

15. The method of claim 14, wherein directly linked devices are identified according to communications exchanged via Link Layer Discovery Protocol ("LLDP").

16. A non-transitory computer-readable storage medium storing a plurality of instructions executable by one or more processors, the plurality of instructions when executed by the one or more processors cause the one or more processors to:
- access model information for a computing network comprising a plurality of layers of linked devices, the model information specifying a network topology for the computing network, a plurality of components of the computing network, and information identifying hierarchical relationships between one or more components from the plurality of components; and
- set up the computing network based upon the model information, wherein setting up the computing network comprises:
  - creating a topology database, wherein creating the topology database comprises:
    - creating switches at each layer in the computing network;
    - mapping links connecting the switches, wherein each link connects a pair of switches;
    - creating Border Gateway Protocol ("BGP") routing for both an underlay network and an overlay network;
    - creating a topology graph of the computing network, wherein the topology graph comprises a plurality of nodes, each of the plurality of nodes representing one of the devices in the computing network, and wherein the nodes are connected by edges, each of the edges representing one link;
    - generating Zero Touch Provisioning ("ZTP") links; and
  - building the computing network based on the topology database.

17. The non-transitory computer-readable storage medium of claim 16, wherein creating the topology graph comprises: placing nodes associated with transit routers at a top of the topology graph, and organizing the nodes according to hierarchy and links.

18. The non-transitory computer-readable storage medium of claim 17, wherein creating the topology graph comprises ingesting the nodes and edges into a visualization tool; and storing an output of the visualization tool as the topology graph in the topology database.

19. A system comprising:
- a computing network comprising:
  - at least one transit router; and
  - a plurality of switches; and
- at least one server communicatingly coupled with the computing network, wherein the at least one server is configured to:
  - access model information for the computing network comprising a plurality of layers of linked devices, the model information specifying a network topology for the computing network, a plurality of components of the computing network, and information identifying hierarchical relationships between one or more components from the plurality of components; and
  - set up the computing network based upon the model information, wherein setting up the computing network comprises:
    - creating a topology database, wherein creating the topology database comprises:
      - creating switches at each layer in the computing network;
      - mapping links connecting the switches, wherein each link connects a pair of switches;
      - creating Border Gateway Protocol ("BGP") routing for both an underlay network and an overlay network;
      - creating a topology graph of the computing network, wherein the topology graph comprises a plurality of nodes, each of the plurality of nodes representing one of the devices in the computing network, and wherein the nodes are connected by edges, each of the edges representing one link;
      - generating Zero Touch Provisioning ("ZTP") links; and
    - building the computing network based on the topology database.

20. The system of claim 19, wherein the at least one server comprises a Network Deployment System ("NDS"); and a Dynamic Host Configuration Protocol ("DHCP") server.

* * * * *

UNITED STATES PATENT AND TRADEMARK OFFICE

CERTIFICATE OF CORRECTION

PATENT NO. : 11,290,332 B2
APPLICATION NO. : 16/932593
DATED : March 29, 2022
INVENTOR(S) : Mutnuru et al.

It is certified that error appears in the above-identified patent and that said Letters Patent is hereby corrected as shown below:

On the Title Page

Column 2, Item (57) under Abstract, Line 2, delete “automation,” and insert -- automation. --, therefor.

Column 2, Item (57) under Abstract, Line 10, delete “topolopgy” and insert -- topology --, therefor.

In the Drawings

On sheet 8 of 18, in FIG. 8, under Reference Numeral 806, Line 3, delete “Loobacks” and insert -- Loopbacks --, therefor.

In the Specification

In Column 8, Lines 47-48, delete “In some embodiments, In some embodiments,” and insert -- In some embodiments, --, therefor.

In Column 19, Line 14, delete “ii)” and insert -- iii) --, therefor.

In Column 19, Lines 33-34, delete “<switch type>” and insert -- <switch_type> --, therefor.

In Column 19, Line 34, delete “<switch number>” and insert -- <switch_number> --, therefor.

In Column 20, Line 1, delete “vi)” and insert -- vii) --, therefor.

In Column 20, Line 3, delete “vii)” and insert -- viii) --, therefor.

In Column 20, Line 5, delete “viii)” and insert -- ix) --, therefor.

In Column 20, Line 7, delete “ix)” and insert -- x) --, therefor.
In Column 20, Line 8, delete “x)” and insert -- xi) --, therefor.

Signed and Sealed this
Sixteenth Day of August, 2022

Katherine Kelly Vidal

Katherine Kelly Vidal
*Director of the United States Patent and Trademark Office*

In Column 21, Line 3, delete “spine_switch_index” and insert -- spine switch index --, therefor.

In Column 21, Line 3, delete “fabric_switch_index” and insert -- fabric switch index --, therefor.

In Column 21, Line 7, delete “spine3[2])->fabric2[6]” and insert -- spine3[2]<->fabric2[6] --, therefor.

In Column 21, Line 17, delete “fabric interface” and insert -- fabric_interface --, therefor.

In Column 21, Line 18, delete “spine interface” and insert -- spine_interface --, therefor.

In Column 21, Line 26, delete “leaf counter” and insert -- leaf_counter --, therefor.

In Column 21, Line 27, delete “leaf no” and insert -- leaf_no --, therefor.

In Column 21, Line 28, delete “uplink no” and insert -- uplink_no --, therefor.

In Column 21, Line 29, delete “(uplink no*leaf no)” and insert -- (uplink_no*leaf_no) --, therefor.

In Column 21, Line 32, delete “leaf counter” and insert -- leaf_counter --, therefor.

In Column 21, Line 34, delete “(leaf interface, fabric interface)” and insert -- (leaf_interface, fabric_interface) --, therefor.

In Column 21, Line 35, delete “leaf counter” and insert -- leaf_counter --, therefor.

In Column 21, Line 58, delete “leaf index” and insert -- leaf_index --, therefor.

In Column 22, Line 2, delete “peer links” and insert -- peer_links --, therefor.

In Column 22, Line 7, delete “native vlan” and insert -- native_vlan --, therefor.

In Column 22, Line 13, delete “/irb-andbridging. html” and insert -- /irb-andbridging.html --, therefor.

In Column 23, Line 6, delete “ii)” and insert -- iii) --, therefor.

In Column 23, Line 8, delete “iii)” and insert -- iv) --, therefor.

In Column 23, Line 10, delete “iv)” and insert -- v) --, therefor.

In Column 23, Line 16, delete “ii)” and insert -- iii) --, therefor.

In Column 23, Line 18, delete “iii)” and insert -- iv) --, therefor.

In Column 23, Line 18, delete “looback” and insert -- loopback --, therefor.

In Column 23, Line 20, delete "iv)" and insert -- v) --, therefor.

In Column 23, Line 20, delete "free loopback ip" and insert -- free_loopback_ip --, therefor.

In Column 24, Line 24, delete "tr_bgp_peer_list" and insert -- tr_bgp peer_list --, therefor.

In Column 24, Line 25, delete "leaf list" and insert -- leaf_list --, therefor.

In Column 24, Line 26, delete "leaf list:" and insert -- leaf_list: --, therefor.

In Column 24, Line 29, delete "leaf_bgp_peer_list" and insert -- leaf_bgp peer_list --, therefor.

In Column 24, Line 31, delete "_peer list" and insert -- _peer_list --, therefor.

In Column 24, Lines 31-33, delete "tr bgp_peer list" and insert -- tr_bgp_peer_list --, therefor.

In Column 25, Line 7, delete "iii)" and insert -- iv) --, therefor.

In Column 25, Line 8, delete "iv)" and insert -- v) --, therefor.

In Column 25, Line 9, delete "v)" and insert -- vi) --, therefor.

In Column 25, Line 43, delete "port driver:" and insert -- port_driver: --, therefor.

In Column 27, Line 57, delete "<tr>-<fabric>-<spine>-<fabric>-<leaf>" and insert -- <tr>--<fabric>--<spine>--<fabric>--<leaf> --, therefor.

In Column 28, Lines 9-12, delete "The location information. Is encoded with the parent hostname and peer interfaces it's connected. This will help DHCP server in deriving correct configuration files which are stored in DHCP server." and insert the same on Column 28, Line 8 as a continuation of the same paragraph.

In Column 28, Line 9, delete "The location information. Is" and insert -- The location information is --, therefor.

In Column 30, Line 55, delete "->" and insert -- --> --, therefor.

In Column 30, Lines 55-56, delete "->" and insert -- --> --, therefor.

In Column 30, Line 56, delete "->" and insert -- --> --, therefor.

In Column 30, Line 56, delete "->" and insert -- --> --, therefor.

In Column 33, Line 22, delete "ii)" and insert -- iii) --, therefor.
In Column 33, Line 57, delete "vi)" and insert -- vii) --, therefor.

In Column 33, Line 59, delete "vii)" and insert -- viii) --, therefor.

In Column 33, Line 61, delete "viii)" and insert -- ix) --, therefor.

In Column 33, Line 63, delete "ix)" and insert -- x) --, therefor.

In Column 33, Line 64, delete "x)" and insert -- xi) --, therefor.

In Column 34, Line 3, delete "transit routers" and insert -- transit_routers --, therefor.

In Column 34, Line 13, delete "fabric_switch_index," and insert -- fabric switch index, --, therefor.

In Column 34, Line 15, delete "n_tr_list," and insert -- n_tr list, --, therefor.

In Column 34, Line 37, delete "spine_switch_index" and insert -- spine switch index --, therefor.

In Column 34, Line 37, delete "fabric_switch_index" and insert -- fabric switch index --, therefor.

In Column 34, Line 41, delete "spine3[2])->fabric2[6]" and insert -- spine3[2]<->fabric2[6] --, therefor.

In Column 34, Line 61, delete "leaf counter" and insert -- leaf_counter --, therefor.

In Column 34, Line 63, delete "uplink no" and insert -- uplink_no --, therefor.

In Column 34, Line 63, delete "fabric_id=" and insert the same on Column 34, Line 64 as a continuation of the line.

In Column 34, Line 64, delete "(uplink no" and insert -- (uplink_no --, therefor.

In Column 35, Line 3, delete "leaf counter" and insert -- leaf_counter --, therefor.

In Column 35, Line 28, delete "leaf index" and insert -- leaf_index --, therefor.

In Column 35, Line 45, delete "native vlan" and insert -- native_vlan --, therefor.

In Column 36, Lines 3-5, delete "https://www.juniper.net/documentation/en_US/junos/topics/topic-map/irb-andbridging.html" and insert the same on Column 36, Line 4 as a new paragraph.

In Column 37, Line 80, delete "nc55500" and insert -- ncs5500 --, therefor.

In Column 39, Line 7, delete ""Opengear/";" and insert -- "^Opengear/"; --, therefor.

In Column 39, Line 15, delete ""ServerTech/";" and insert -- "^ServerTech/"; --, therefor.

In Column 39, Line 17, delete "servertechidentifier" and insert -- servertech.identifier --, therefor.

In Column 44, Lines 7-20, delete “REQUEST message with option 43, sub option 01. In the manner, the DHCP server 120 can update the device with its info like vendor name and model. The DHCP server 120 can further identify the initial configuration file to be downloaded on the switch based on vendor/model. In some embodiments, the initial configuration file contains an event policy that, when executed by the triggering device, causes the triggering device to identify and download one or several relevant scripts. When received by the triggering device, this event policy causes the triggering device to gather information relating to coupled devices and to download executable scripts, referred to herein as stage2 scripts.” and insert the same on Column 44, Line 8 as a continuation of the same paragraph., therefor.

In Column 45, Line 5, delete “2.” and insert -- 6. --, therefor.

In Column 45, Line 10, delete “3.” and insert -- 7. --, therefor.

In Column 45, Line 13, delete “4.” and insert -- 8. --, therefor.

In Column 47, Lines 18-19, delete “that that” and insert -- that --, therefor.

In Column 47, Line 19, delete “that that” and insert -- that --, therefor.